US009924436B2

United States Patent
Grob et al.

(10) Patent No.: US 9,924,436 B2
(45) Date of Patent: Mar. 20, 2018

(54) MOBILE DEVICES WITH FEMTO CELL FUNCTIONALITY

(71) Applicant: QUALCOMM Incorporated, San Diego, CA (US)

(72) Inventors: Matthew S. Grob, San Diego, CA (US); Mehmet Yavuz, San Diego, CA (US); Sanjiv Nanda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 14/275,767

(22) Filed: May 12, 2014

(65) Prior Publication Data

US 2014/0248870 A1    Sep. 4, 2014

Related U.S. Application Data

(62) Division of application No. 12/433,425, filed on Apr. 30, 2009, now Pat. No. 8,755,350.

(Continued)

(51) Int. Cl.
*H04W 36/30* (2009.01)
*H04W 36/04* (2009.01)
(Continued)

(52) U.S. Cl.
CPC ........... *H04W 36/30* (2013.01); *H04W 24/08* (2013.01); *H04W 36/0022* (2013.01);
(Continued)

(58) Field of Classification Search
CPC .................................................... H04W 36/04
See application file for complete search history.

(56) References Cited

U.S. PATENT DOCUMENTS 4,882,765 A    11/1989   Maxwell et al.
6,529,491 B1    3/2003   Chang et al.
(Continued)

FOREIGN PATENT DOCUMENTS

CN      1709002 A      12/2005
CN    101103646 A       1/2008
(Continued)

OTHER PUBLICATIONS

3G TR 25.924 v1.0.0 (Dec. 1999), 3rd Generation Partnership Project; Technical Specification Group Radio Access Network; Opportunity Driven Multiple Access (3G TR 25.924 version 1.0.0).

(Continued)

*Primary Examiner* — Brian D Nguyen
*Assistant Examiner* — Toan Nguyen
(74) *Attorney, Agent, or Firm* — Dalei Dong; Arent Fox, LLP

(57) ABSTRACT

Aspects describe communications environments in which femtocell capability is provided to devices within the communications network. A non-femto enabled device and/or a femto enabled device can communicate with a femto enabled device in the same geographical area for femto-enabled peer-to-peer communication. Two non-femto enabled devices can be provided femto functionality through utilization of a femto enabled device, which operates as a hub between the two devices. Other aspects relate to enhanced position determination, adaptive coverage enhancement, local mobile networks, open access femtocells without a backhaul, and local broadcast of media though utilization of femto enabled devices.

21 Claims, 14 Drawing Sheets

Related U.S. Application Data

(60) Provisional application No. 61/061,554, filed on Jun. 13, 2008, provisional application No. 61/077,536, filed on Jul. 2, 2008.

(51) Int. Cl.

| | |
|---|---|
| *H04W 88/04* | (2009.01) |
| *H04W 76/02* | (2009.01) |
| *H04W 24/08* | (2009.01) |
| *H04W 36/00* | (2009.01) |
| *H04W 36/32* | (2009.01) |
| *H04W 64/00* | (2009.01) |
| *H04W 84/04* | (2009.01) |

(52) U.S. Cl.
CPC ......... *H04W 36/04* (2013.01); *H04W 76/023* (2013.01); *H04W 88/04* (2013.01); *H04W 36/32* (2013.01); *H04W 64/00* (2013.01); *H04W 84/045* (2013.01)

(56) References Cited

U.S. PATENT DOCUMENTS

| | | | |
|---|---|---|---|
| 6,968,153 | B1 | 11/2005 | Heinonen et al. |
| 7,209,739 | B1 | 4/2007 | Narayanabhatla |
| 7,277,711 | B2* | 10/2007 | Nyu .................. H04W 4/20 455/404.2 |
| 7,356,015 | B2 | 4/2008 | Ibe et al. |
| 7,502,365 | B2* | 3/2009 | Yamagata ........... H04W 74/085 370/345 |
| 7,720,021 | B1* | 5/2010 | Zhou ................... H04W 88/04 370/315 |
| 7,929,970 | B1* | 4/2011 | Gunasekara ........ H04W 36/04 455/437 |
| 8,243,632 | B1* | 8/2012 | Oh ...................... H04W 92/20 370/277 |
| 8,868,083 | B2* | 10/2014 | Wallis .................. H04W 24/02 455/444 |
| 9,037,134 | B2 | 5/2015 | Grob et al. |
| 2002/0077151 | A1 | 6/2002 | Matthews et al. |
| 2002/0193073 | A1 | 12/2002 | Fujioka |
| 2003/0087646 | A1 | 5/2003 | Funato et al. |
| 2003/0099212 | A1 | 5/2003 | Anjum et al. |
| 2004/0127214 | A1 | 7/2004 | Reddy et al. |
| 2004/0136338 | A1 | 7/2004 | Lin et al. |
| 2004/0243580 | A1 | 12/2004 | Markki et al. |
| 2005/0180343 | A1 | 8/2005 | Van |
| 2005/0186907 | A1 | 8/2005 | Tailor |
| 2005/0286476 | A1 | 12/2005 | Crosswy et al. |
| 2007/0008922 | A1 | 1/2007 | Abhishek et al. |
| 2007/0178839 | A1 | 8/2007 | Rezvani et al. |
| 2007/0254620 | A1 | 11/2007 | Lindqvist et al. |
| 2008/0062866 | A1 | 3/2008 | Jiang et al. |
| 2008/0076398 | A1 | 3/2008 | Mate et al. |
| 2008/0220813 | A1* | 9/2008 | Brown .................. H04W 4/16 455/552.1 |
| 2008/0285504 | A1 | 11/2008 | Lin |
| 2008/0293433 | A1 | 11/2008 | Wallis |
| 2008/0305801 | A1 | 12/2008 | Burgess et al. |
| 2009/0052395 | A1 | 2/2009 | Bao et al. |
| 2009/0052418 | A1 | 2/2009 | Semper |
| 2009/0092097 | A1 | 4/2009 | Nylander et al. |
| 2009/0093252 | A1 | 4/2009 | Czaja et al. |
| 2009/0156165 | A1* | 6/2009 | Raghothaman ......... H04L 63/10 455/411 |
| 2009/0163216 | A1 | 6/2009 | Hoang et al. |
| 2009/0196371 | A1 | 8/2009 | Yamamoto et al. |
| 2009/0231191 | A1 | 9/2009 | Wu et al. |
| 2009/0310561 | A1 | 12/2009 | Grob et al. |
| 2009/0312017 | A1 | 12/2009 | Grob et al. |
| 2010/0210289 | A1 | 8/2010 | Rooks et al. |
| 2015/0245273 | A1 | 8/2015 | Grob et al. |

FOREIGN PATENT DOCUMENTS

| | | |
|---|---|---|
| CN | 101218835 A | 7/2008 |
| CN | 101499841 A | 8/2009 |
| EP | 1538862 A1 | 6/2005 |
| JP | 2002544727 A | 12/2002 |
| JP | 2003188894 A | 7/2003 |
| JP | 2005168032 A | 6/2005 |
| JP | 2005328557 A | 11/2005 |
| JP | 2005348397 A | 12/2005 |
| JP | 2006311168 A | 11/2006 |
| JP | 2009500969 A | 1/2009 |
| JP | 2009538019 A | 10/2009 |
| JP | 2010501140 A | 1/2010 |
| JP | 2010507990 A | 3/2010 |
| KR | 20080032078 A | 4/2008 |
| RU | 2193277 C2 | 11/2002 |
| WO | 0069186 A1 | 11/2000 |
| WO | 0251018 A2 | 6/2002 |
| WO | 03015356 | 2/2003 |
| WO | 2007008857 A2 | 1/2007 |
| WO | WO-2007040452 A1 | 4/2007 |
| WO | 2007055544 A2 | 5/2007 |
| WO | 2007135493 A1 | 11/2007 |
| WO | 2008004102 | 1/2008 |
| WO | 2008030956 A2 | 3/2008 |
| WO | 2008042192 A1 | 4/2008 |
| WO | 2008051609 A2 | 5/2008 |
| WO | 2008066929 A2 | 6/2008 |

OTHER PUBLICATIONS

International Search Report and Written Opinion—PCT/US2009/044217, International Search Authority—European Patent Office—dated Dec. 28, 2009.

QUALCOMM Europe: "Restricted Association for HNBs" 3GPP Draft; R2-074406, 3rd Generation Partnership Project (3GPP), Mobile Competence Centre ; 650, Route Des Lucioles ; F-06921 Sophia-Antipolis Cedex ; France, vol. RAN WG2, No. Shanghai, China; Oct. 8, 2007, Oct. 1, 2007 (Oct. 1, 2007), XP050136972 the whole document.

European Search Report—EP14177621—Search Authority—Munich—dated Sep. 16, 2014.

Teyeb O., et al. "Dynamic Relaying in 3GPP LTE-Advanced Networks", EURASIP Journal on Wireless Communications and Networking, Mar. 31, 2009, pp. 1-11.

* cited by examiner

MOBILE DEVICES WITH FEMTO CELL FUNCTIONALITY

CROSS-REFERENCE TO RELATED APPLICATIONS

The present Application for Patent is a divisional of U.S. application Ser. No. 12/433,425 entitled "Mobile Devices With Femto Cell Functionality" filed Apr. 30, 2009, now U.S. Pat. No. 8,755,350, which claims priority to Provisional Application No. 61/061,554 entitled "System, Apparatus, and Method to Enable Femtocell Functionality for Cellular Mobile Terminals" filed Jun. 13, 2008, and Provisional Application No. 61/077,536 entitled "Mobile Devices with Femto Cell Functionality" filed Jul. 2, 2008, each assigned to the assignee hereof and each hereby expressly incorporated by reference herein.

The present application is related to commonly owned U.S. application Ser. No. 12/433,417, now U.S. Pat. No. 9,037,134, entitled, "MOBILE DEVICES WITH FEMTO CELL FUNCTIONALITY," the disclosure of which is hereby incorporated by reference herein.

BACKGROUND

Field

The following description relates generally to wireless communications, and more specifically to enabling femtocell functionality in a wireless communications environment.

Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

Recently, users have started to replace fixed line communications with mobile communications and have increasingly demanded great voice quality, reliable service, and low prices.

In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB) or femtocells. Typically, such miniature base stations are connected to the Internet and the mobile operator's network via DSL router or cable modem.

Even a communication between a geographically proximate calling mobile unit and destination mobile unit is sent from the calling mobile unit to a base station. The communication is sent over a backhaul before it is directed back to the same base station to transmit to the destination mobile.

Some standards and protocols have been developed for applications, such as peer-to-peer services for mobile terminals. However, these standards and protocols do not address legacy terminals. In other words, they require new mobile terminals to make use of new standards.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method for creating a local mobile network includes transmitting a pilot and common overhead channels from a first mobile device having a mobile station modem (MSM) and a cell site modem (CSM). The method further includes establishing a first communication link including at least one of transmitting forward link communication to a second mobile device and receiving a reverse link communication from the second mobile device via the first communication link.

In another aspect, a wireless communication apparatus includes means for transmitting a pilot and common overhead channels from a first mobile device having a mobile station modem (MSM) and a cell site modem (CSM). The wireless communication apparatus further includes means for establishing a communication link including at least one of transmitting communication on a forward link to a second mobile device and receiving communication on a reverse link from the second mobile device.

In another aspect, a wireless communication apparatus includes a transmitter for transmitting a pilot and common overhead channels from a first mobile device having a mobile station modem (MSM) and a cell site modem (CSM). The wireless communication apparatus further includes the transmitter being configured to establish a communication link including at least one of transmitting forward link communication to a second mobile device and receiving reverse link communication from the second mobile device.

In another aspect, a computer program product comprises a computer-readable medium that includes a first set of codes for causing the computer to transmit a pilot and common overhead channels from a first mobile device having a mobile station modem (MSM) and a cell site modem (CSM). The computer-readable medium further includes a third set of codes for causing the computer establish a communication link including at least one of transmitting communication on a forward link to a second mobile device and receiving communication on a reverse link from the second mobile device.

In another aspect, at least one processor configured to create a local mobile network includes a first module for transmitting a pilot and common overhead channels from a first mobile device having a mobile station modem (MSM) and a cell site modem (CSM). The at least one processor further includes a second module for accepting at least one registration request from a second mobile device in response to the pilot and common overhead channels. The at least one processor further includes a third module for transmitting communication on a forward link to the second mobile device.

In another aspect, a method for enabling femtocell functionality includes receiving an origination message from a first device for communication with a second device. The method further includes determining if the first device and the second device are geographically proximate. The method further includes determining if a femto enabled device is geographically proximate to the first and second device. The method further includes performing a handoff for the first device to the femto enabled device, if the first device, second device, and femto enabled device are geographically proximate.

In another aspect, a wireless communication apparatus includes a receiver for receiving an origination request from a first device for communication with a second device. The wireless communication apparatus further includes a processor for determining if the first device and the second device are geographically proximate and if a femto enabled device is geographically proximate to the first and second device. The wireless communication apparatus further includes a transmitter for performing a handoff for the first device to the femto enabled device, if the first device, second device, and femto enabled device are geographically proximate.

In another aspect, a method for enabling communication through a femto enabled device, includes receiving communication from a Radio Access Network (RAN) regarding an origination from a first device for communication with a second device. The method further includes setting up communication between the first and second device based on the communication from the RAN.

In another aspect, a mobile communication apparatus includes a receiver for receiving wireless communications on a forward link from a Radio Access Network (RAN) and on a reverse link from at least one mobile communication apparatus. The mobile communication apparatus further includes a transmitter for transmitting wireless information on a reverse link to the RAN and on a forward link to the at least one mobile communication apparatus.

In another aspect, a wireless communications apparatus that enables femtocell functionality includes means for receiving an origination message from a first device for communication with a second device. The wireless communications apparatus further includes means for determining if the first device and the second device are geographically proximate. The wireless communication apparatus further includes means for determining if a femto enabled device is geographically proximate to the first and second device. The wireless communication apparatus further includes means for performing a handoff for the first device to the femto enabled device, if the first device, second device, and femto enabled device are geographically proximate.

In another aspect, a wireless communications apparatus includes means for transmitting wireless femtocell communication. The wireless communications apparatus further includes means receiving communication from an RAN regarding an origination from a first device for communication with a second device. The wireless communication apparatus further includes means for setting up communication between the first and second device based on the communication from the RAN.

In another aspect, a computer program product includes a computer-readable medium comprising a first set of codes for causing a computer to receive an origination message from a first device for communication with a second device. The computer-readable medium further includes a second set of codes for causing the computer to determine if the first device and the second device are geographically proximate. The computer-readable medium further includes a third set of codes for causing the computer to determine if a femto enabled device is geographically proximate to the first and second device. The computer-readable medium further includes a fourth set of codes for causing the computer to perform a handoff for the first device to the femto enabled device, if the first device, second device, and femto enabled device are geographically proximate.

In another aspect, a computer product program including a computer readable medium comprises a first set of codes for causing a computer to transmit wireless femtocell communication. The computer readable medium further comprises a second set of codes for causing the computer to receive communication from an RAN regarding an origination from a first device for communication with a second device. The computer readable medium further comprises a third set of codes for causing the computer to set up communication between the first and second device based on the communication from the RAN.

In another aspect, at least one processor configured to enable femtocell functionality, includes a first module for receiving an origination message from a first device for communication with a second device. The at least one processor further includes a second module for determining if the first device and the second device are geographically proximate. The at least one processor further includes a third module for determining if a femto enabled device is geographically proximate to the first and second device. The at least one processor further includes a fourth module for performing a handoff for the first device to the femto enabled device, if the first device, second device, and femto enabled device are geographically proximate.

In another aspect, at least one processor configured to enable femtocell functionality includes a first module for transmitting wireless femtocell communication. The at least one processor further includes a second module for receiving communication from an RAN regarding an origination from a first device for communication with a second device. The at least one processor further includes a third module for setting up communication between the first and second device based on the communication from the RAN.

In another aspect, a method for enabling adaptive coverage using a femto enabled device includes detecting poor cellular coverage. The method further includes connecting to an alternative wireless backhaul. The method further includes transmitting a pilot and common overhead channels. The method further includes receiving a first communication from a cellular mobile device on a reverse link for forwarding via the alternative wireless backhaul. The method further includes transmitting a second communication to the cellular mobile device on a forward link, wherein the second communication was received via the alternative wireless backhaul.

In another aspect, a wireless communication apparatus includes means for detecting poor cellular coverage. The wireless communication apparatus further includes means for connecting to an alternative wireless backhaul. The wireless communication apparatus further includes means for transmitting a pilot and common overhead channels. The wireless communication apparatus further includes means for receiving a first communication from a cellular mobile device on a reverse link for forwarding via the alternative wireless backhaul. The wireless communication apparatus further includes means for transmitting a second communication to the cellular mobile device on a forward link, wherein the second communication was received via the alternative wireless backhaul.

In another aspect, a wireless communication apparatus includes a detector for detecting poor cellular coverage. The wireless communication apparatus further includes a processor for connecting to an alternative wireless backhaul. The wireless communication apparatus further includes a transmitter for transmitting a pilot and common overhead channels. The wireless communication apparatus further includes a receiver for receiving a first communication from a cellular mobile device on a reverse link for forwarding via the alternative wireless backhaul. The wireless communication apparatus further includes the transmitter being configured to transmit a second communication to the cellular mobile device on a forward link, wherein the second communication was received via the alternative wireless backhaul.

In another aspect, a computer program product comprises a computer-readable medium that includes a first set of codes for causing the computer to detect poor cellular coverage. The computer-readable medium further includes a second set of codes for causing the computer to connect to an alternative wireless backhaul. The computer-readable medium further includes a third set of codes for causing the computer to transmit a pilot and common overhead channels. The computer-readable medium further includes a fourth set of codes for causing the computer to receive a first communication from a cellular mobile device on a reverse link for forwarding via the alternative wireless backhaul. The computer-readable medium further includes a fifth set of codes for causing the computer to transmit a second communication to the cellular mobile device on a forward link, wherein the second communication was received via the alternative wireless backhaul.

In another aspect, at least one processor configured to enable adaptive coverage using a femto enabled device includes a first module for detecting poor cellular coverage. The at least one processor configured to enable adaptive coverage using a femto enabled device further comprises a second module for connecting to an alternative wireless backhaul. The at least one processor configured to enable adaptive coverage using a femto enabled device further comprises a third module for transmitting a pilot and common overhead channels. The at least one processor configured to enable adaptive coverage using a femto enabled device further comprises a fourth module for receiving a first communication from a cellular mobile device on a reverse link for forwarding via the alternative wireless backhaul. The at least one processor configured to enable adaptive coverage using a femto enabled device further comprises a fifth module for transmitting a second communication to the cellular mobile device on a forward link, wherein the second communication was received via the alternative wireless backhaul.

In another aspect, method for transmitting position location information using a femto enabled device includes obtaining position information of a femto enabled device. The method further includes communicating the position information to a location determination entity. The method further includes transmitting the location information of the femto enabled device to a mobile device.

In another aspect, a wireless communication apparatus includes means for obtaining position information of a femto enabled device. The wireless communication apparatus further includes means for includes communicating the position information to a location determination entity. The wireless communication apparatus further includes means for transmitting the location information of the femto enabled device to a mobile device.

In another aspect, a wireless communication apparatus includes a position obtainer for obtaining a position of a femto enabled device. The wireless communication apparatus further includes a transmitter for communicating location information of the femto enabled device to a location determination entity. The wireless communication apparatus further includes a transmitter for transmitting the location information of the femto enabled device to a mobile device.

In another aspect, a computer program product comprises a computer-readable medium that includes a first set of codes for causing the computer to obtain position information of a femto enabled device. The computer-readable medium further includes a second set of codes for causing the computer to communicate the position information to a location determination entity. The computer-readable medium further includes a third set of codes for causing the computer to transmit the location information of the femto enabled device to a mobile device In another aspect, at least one processor configured to transmit position location information using a femto enabled device includes a first module for obtaining position information of a femto enabled device. The at least one processor configured to transmit position location information using a femto enabled device includes a second module for communicating the position information to a location determination entity. The at least one processor configured to transmit position location information using a femto enabled device includes a third module for transmitting the location information of the femto enabled device to a mobile device.

In another aspect, a method for determining position location using pilot information received from a femto enabled device includes receiving a pilot or overhead signal including position information from a femto enabled device. The method further includes transmitting the received position information to a location determination entity. The method further includes receiving a current position from the location determination entity based at least in part on the received signal from the femto enabled device.

In another aspect, a wireless communication apparatus configured to determine position location using pilot information received from a femto enabled device includes means for receiving a pilot or overhead signal including position information from a femto enabled device. The apparatus further includes means for transmitting the received position information to a location determination entity. The apparatus further includes means for receiving a current position from the location determination entity based at least in part on the received signal from the femto enabled device.

In another aspect, a wireless communication apparatus configured to determine position location using pilot information received from a femto enabled device includes a receiver for receiving a pilot or overhead signal including position information from a femto enabled device. The apparatus further includes a transmitter for transmitting the received position information to a location determination entity. The apparatus further includes a receiver for receiving a current position from the location determination entity based at least in part on the received signal from the femto enabled device.

In another aspect, a computer program product includes a computer-readable medium having a first set of codes for causing the computer to receive a pilot or overhead signal including position information from a femto enabled device. The computer readable medium further includes a second set of codes for causing the computer to transmit the received position information to a location determination entity. The computer readable medium further includes a third set of codes for causing the computer to receive a current position from the location determination entity based at least in part on the received signal from the femto enabled device.

In another aspect, at least one processor configured to determine position location using a femto enabled device includes a first module for receiving a pilot or overhead signal including position information from a femto enabled device. The at least one processor further includes a second module for transmitting the received position information to a location determination entity. The at least one processor further includes a third module for receiving a current position from the location determination entity based at least in part on the received signal from the femto enabled device.

In another aspect, a method for determining position location using pilot information received from a femto enabled device includes receiving a pilot or overhead signal including position information from a femto enabled device. The method further includes calculating a position based at least in part on the position information from the femto enabled device.

In another aspect, a wireless communication apparatus configured to determine position location using pilot information received from a femto enabled device includes means for receiving a pilot or overhead signal including position information from a femto enabled device. The apparatus further includes means for calculating a position based at least in part on the position information from the femto enabled device.

In another aspect, a wireless communication apparatus configured to determine position location using pilot information received from a femto enabled device includes a receiver for receiving a pilot or overhead signal including position information from a femto enabled device. The apparatus further includes a processor for calculating a position based at least in part on the position information from the femto enabled device.

In another aspect, a computer program product includes a computer-readable medium having a first set of codes for causing the computer to receive a pilot or overhead signal including position information from a femto enabled device. The computer readable medium further includes a second set of codes for causing the computer to calculate a position based at least in part on the position information from the femto enabled device.

In another aspect, at least one processor configured to determine position location using a femto enabled device includes a first module for receiving a pilot or overhead signal including position information from a femto enabled device. The at least one processor further includes a second module for calculating a position based at least in part on the position information from the femto enabled device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
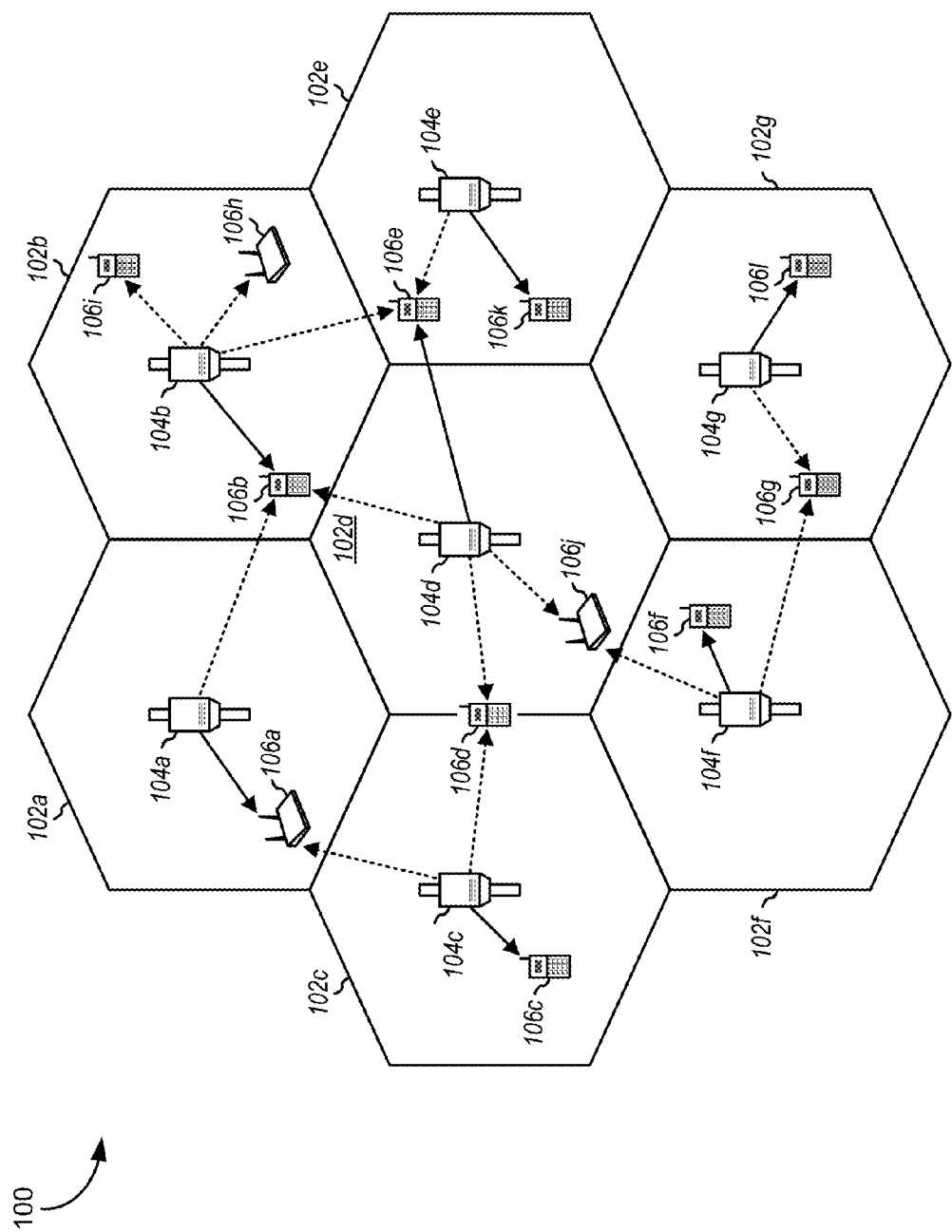
FIG. 1 illustrates an exemplary wireless communication system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, device, remote station, remote terminal, access terminal, user terminal, terminal, wireless communication device, wireless communication apparatus, user agent, user device, or user equipment (UE). A mobile device can be a cellular telephone, a cellular mobile device, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, Node B, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

FIG. 1 illustrates an exemplary wireless communication system 100 configured to support a number of users, in which various disclosed embodiments and aspects may be implemented. As shown in FIG. 1, by way of example, system 100 provides communication for multiple cells 102, such as, for example, macro cells 102a-102g, with each cell being serviced by a corresponding access point (AP) 104 (such as APs 104a-104g). Each cell may be further divided into one or more sectors. Various access terminals (ATs) 106, including ATs 106a-106k, also known interchangeably as user equipment (UE) or mobile stations, are dispersed throughout the system. Each AT 106 may communicate with one or more APs 104 on a forward link (FL) and/or a reverse link (RL) at a given moment, depending upon whether the AT is active and whether it is in soft handoff, for example. The wireless communication system 100 may provide service over a large geographic region, for example, macro cells 102a-102g may cover a few blocks in a neighborhood.

Figure 2:
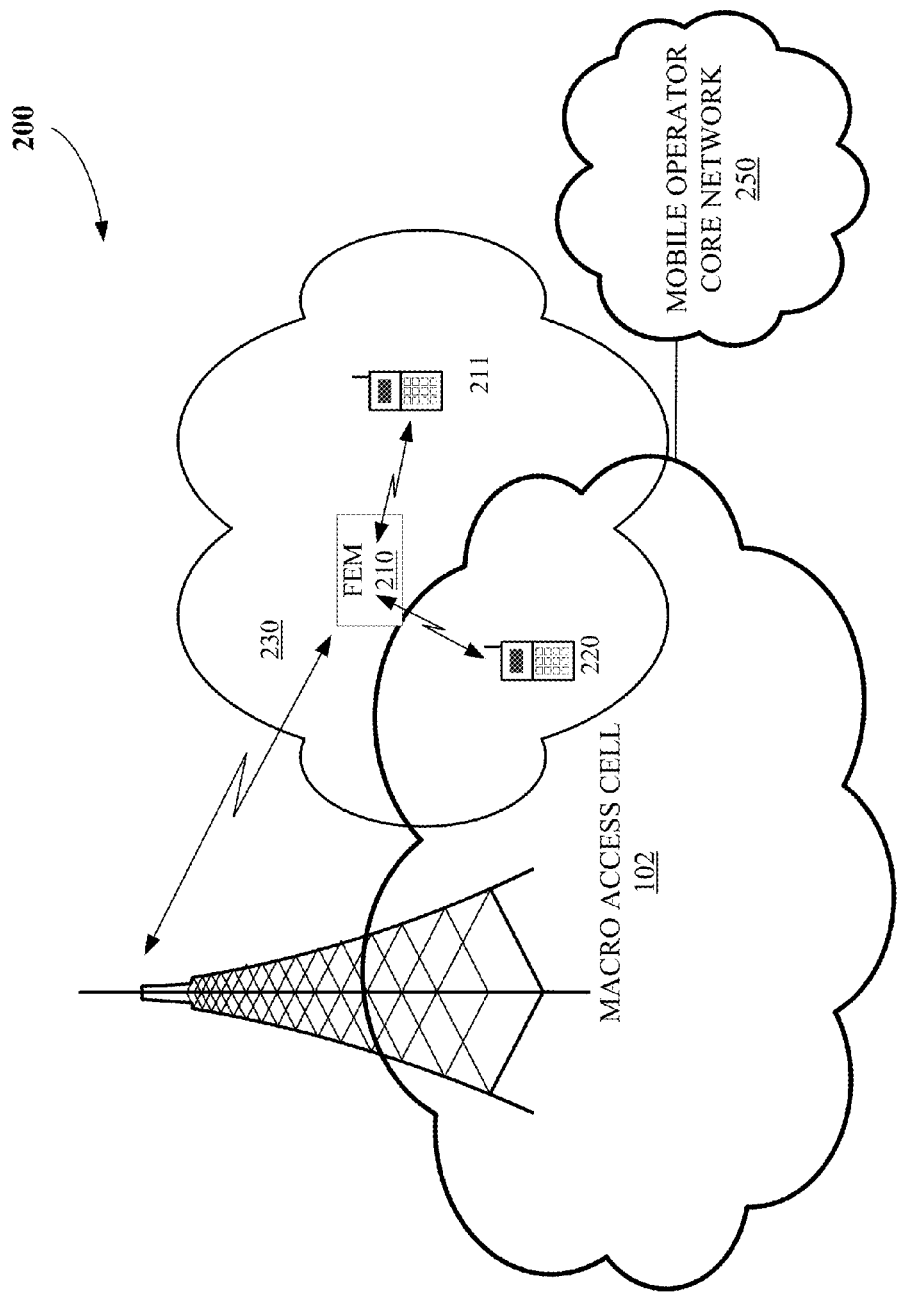
FIG. 2 illustrates an exemplary communication system to enable deployment of access point base stations within a network environment.

FIG. 2 illustrates an exemplary communication system to enable mobile femtocell functionality within a network environment. As shown in FIG. 2, the system 200 includes one or more user equipment (UE) 220 and 211, each illustrated as being in a corresponding femto enabled small scale network environment 230. It should be noted that any number of UEs may be within the femto enabled small scale network environment 230. Further, in this example, UE 220 may be in communication with both the femto enabled small scale network environment 230 and a macro access cell 102, such as a base station associated with a cellular network, whereas UE 211 may be in communication with the femto enabled small scale network environment 230 but is outside of the coverage the macro access cell 102. The UEs 220 and 211 may be a legacy UE or Femto-enabled UE. A femto enabled mobile (FEM) device 210 creates the femto enabled small scale network environment 230, which occupies a geographic area, wherein, in this aspect, UEs 220 and 211 are positioned in the geographic area. As will be discussed in further detail below, FEM 210 and the femto enabled small scale network environment 230 enables local communications between UEs within network environment 230 via FEM 210, and/or enables communications via FEM 210 between a UE within network environment 230 and a macro access cell 102. The femto enabled small scale network environment 230 may be within or overlap the macro access cell 102, although it will have a smaller scale than the macro access cell 102. Additionally, it should be noted that no wireline or backhaul is required for the FEM 210 to create the femto enabled small scale network environment 230, thereby enabling femto enabled small scale network environment 230 to be very dynamic.

Although embodiments described herein use 3GPP terminology, it is to be understood that the embodiments may be applied to 3GPP (Rel99, Rel5, Rel6, Rel7, Rel8, Rel9) technology, as well as 3GPP2 (1×RTT, 1×EV-DO Rel0, RevA, RevB) technology and other known and related technologies. In such aspects described herein, the owner of the FEM 210 and the owner of the UE 220 may subscribe to mobile service, such as, for example, 3G mobile service, offered through the mobile operator core network 250, and the UE 220 may be capable to operate both in macro cellular environment and in femto enabled small scale network environment. Thus, the FEM 210 is backward compatible with any existing UE 220 and any existing network 250.

Furthermore, in addition to macro cell 102 access to the macro cell mobile network 250, the UE 220 can be served by a predetermined number of FEMs 210, for example the FEM 210 that generates the femto enabled small scale environment 230 within with the UE is operating. In some aspects, UE 220 may be in a soft handover state with the macro network 250 while in communication with FEM 210. In other words, in some aspects, the UE 220 can communicate with the macro network 250 and the FEM 210. In some aspects, which should not be construed as limiting, as long as the UE 220 is authorized to communicate with the FEM 210 and has a connection with a sufficient quality, it may be desired that the UE 220 communicate only with the associated FEM 210. For example, if UE wants to communicate with another UE in the same femto enabled small scale network environment 230, such communication may be serviced via the FEM 210 rather than via the macro network 250.

Figure 3:
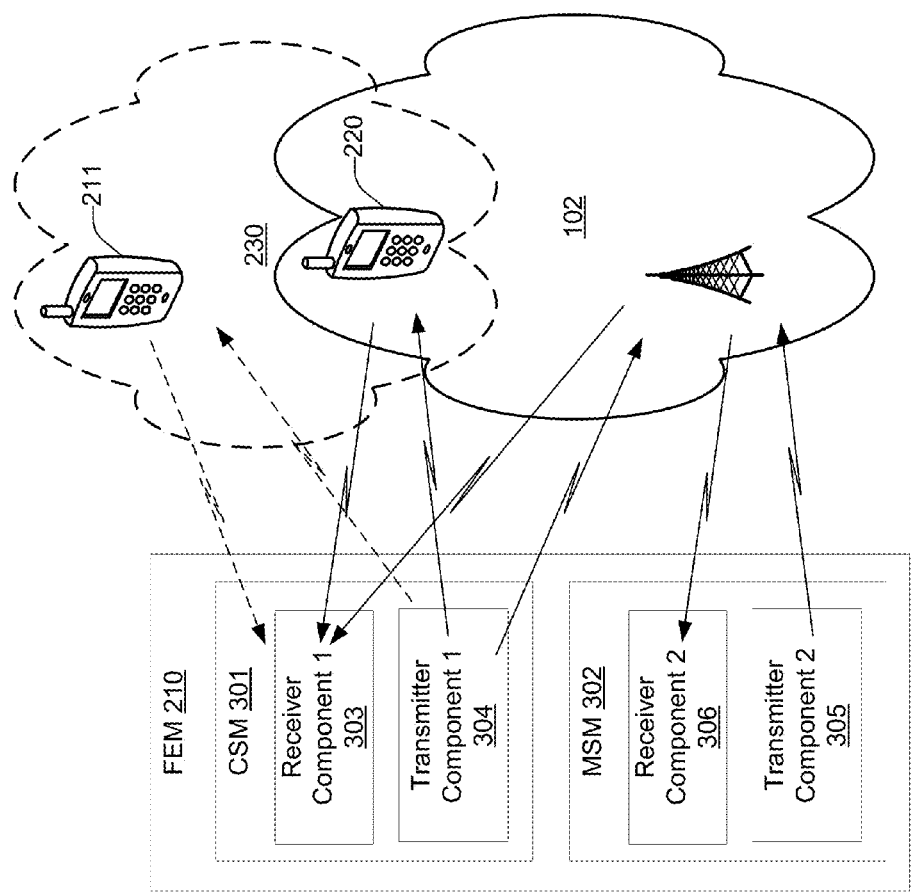
FIG. 3 illustrates an exemplary diagram of components in a femto enabled device.

FIG. 3 illustrates exemplary components within a femto enabled mobile (FEM) device 210. The FEM 210 includes a cell site modem (CSM) component 301, which includes hardware, software and instructions to enable FEM 210 to act as a base station, and a mobile station modem (MSM) component 302 to enable FEM 210 to act as a mobile station or UE. For example, CSM component 301 may include network-side, inter-base station communication protocols, whereas MSM component 302 may include mobile air interface protocols. Further, the CSM component 301 includes a first receiver component 303, such as receive chain hardware and software and an antenna, configured to receive communication from a radio access network (RAN) 102 via a forward link, and a first transmitter component 304, such as transmit chain hardware and software and an antenna, configured to transmit communication to the RAN via a reverse link. The communication between CSM 301 and the RAN is via the inter-base station communication protocols. Additionally, first transmitter component 304 of CSM 301 additionally enables sending communications to or more UEs, such as UE 220, via a forward link, while first receiver component 304 additionally enables receipt of communication from one or more UEs via a reverse link. The communication between the CSM 301 and UE 220 is via the mobile air interface protocols such that FEM 210 appears as a base station to other UEs. Also, the MSM component 302 includes a second receiver component 306, such as receive chain hardware and software and an antenna, configured to receive communication from RAN 102 via a forward link. The MSM component 302 also includes a second transmitter component 305, such as transmit chain hardware and software and an antenna, configured to transmit communication to the RAN via a reverse link. The communication between MSM 302 and the RAN 102 is via the mobile air interface protocols such that FEM 210 appears as another mobile station or UE to the RAN 102.

Thus, the FEM can establish and/or maintain a communication link with a mobile device on which it transmit a forward link communication to the mobile device and receive reverse link communication from the mobile device. The FEM may act as an ordinary mobile device and establish and/or maintain a communication link with a RAN on which it receives forward link communication from the RAN and transmits reverse link communication to the RAN.

Accordingly, in one aspect, using CSM 301 to act as a base station, the FEM 210 may be operable to enable communications between UE 211 and/or UE 220 and RAN 102. For example, if UE 211 is out of range of RAN 102 but within range of FEM 210, FEM 210 acts as a bridge to RAN 102 for UE 211. Further, using CSM 301 acting as a base station, the FEM 210 may be operable to enable communications between two or more UEs, such as UE 211 and UE 220, within the femto enabled small scale network environment of FEM 210. The FEM 210 may also broadcast information within the femto enabled small scale network environment 230. The information may include content locally stored at the FEM such as media, pictures, songs, etc. The information may include content obtained at the FEM such as a temperature measurement, an audio recording, a webcam type recording, among others. The information may also include content and/or broadcasts received via a cellular network. For example, the content may include information received via a MediaFlo™ type broadcast. For example, the FEM may receive satellite or digital television broadcasts and rebroadcasting the information. In some aspects, the FEM may not need to transmit the information in the same format in which it is received at the FEM, but may instead convert the information into a format acceptable for use on the devices within the femto enabled small scale network environment 230.

Figure 4:
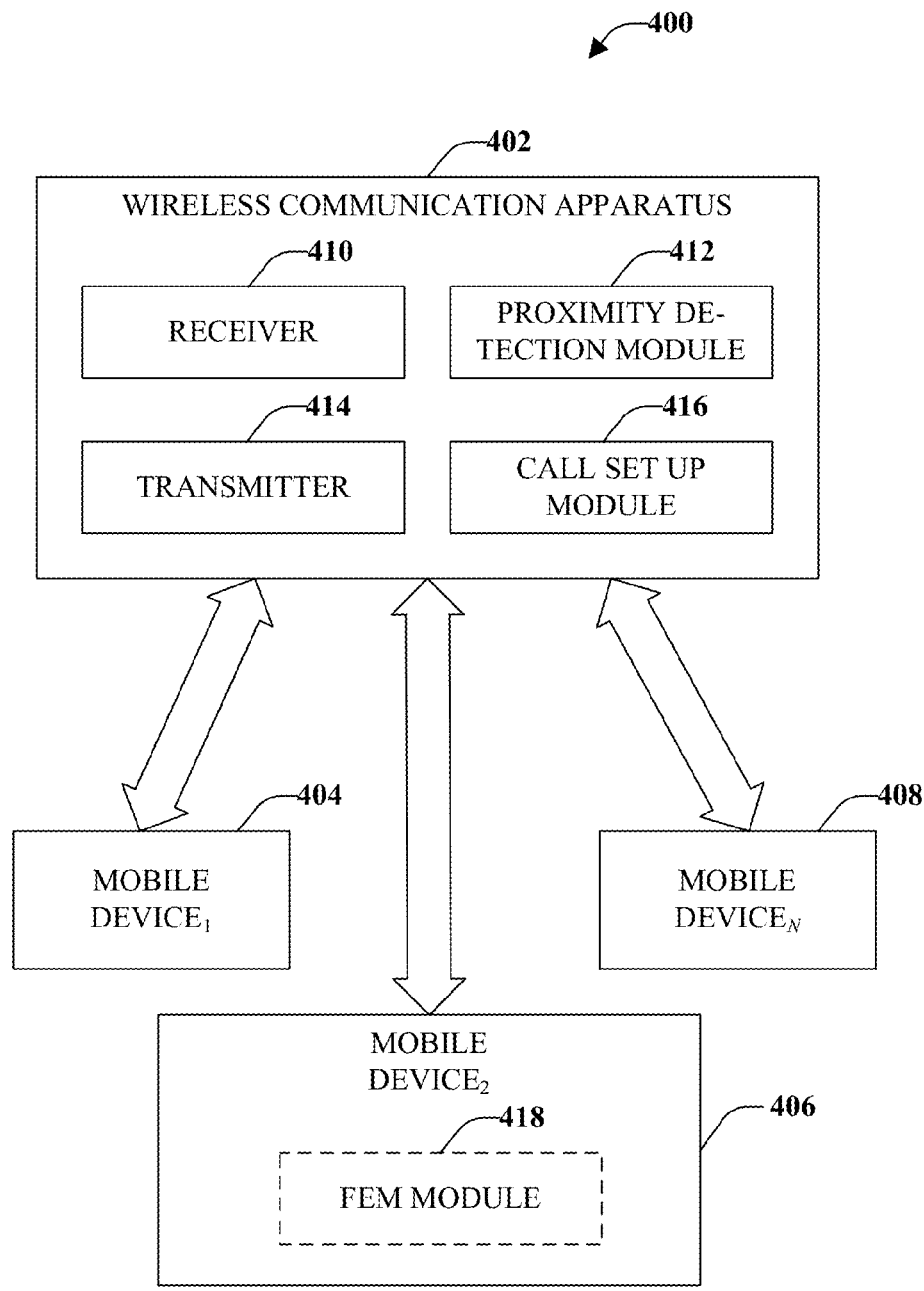
FIG. 4 illustrates a system that enables femtocell functionality in a wireless communications environment.

FIG. 4 illustrates a system 400 that enables femtocell functionality in a wireless communications environment. "Femtocell" is a term generally used for a base station having a relatively small coverage area, such as corresponding to a user's (e.g., subscriber's) residence or place of business, for providing cellular service within a home or business environment. For example, one or more femtocells may be used to provide radio coverage within a building, such as in a location where macro cell access signals are not able to penetrate or have a weak signal strength. Femtocells usually employ radio access network (RAN) functionality (e.g., base transceiver system (BTS), base station controller (BSC), packet data serving node (PDSN), or other network elements) and provide service to a limited number of users. Femtocells can be connected to the Internet and the cellular operator's network through a DSL router, cable modem, or by other techniques.

In accordance with some aspects, a mobile terminal that is capable of cellular communications with a base station (e.g., macrocell, picocells or femtocell) is enabled with radio access network (RAN) functionality similar to a femtocell, such mobile devices are referred to herein as Femto Enabled Mobiles (FEM), femtocell enabled mobiles, or attocells. For example, a mobile terminal can include a Mobile Station Modem (MSM) chipset and a Cell Site Modem (CSM) chipset and associated software to support base station types of operation. Among other things, such base station types of operation include over the air transmission on a forward link band and reception of data on a reverse link band. Different applications can be enabled for non-femto enabled devices (also referred to herein as legacy terminals) in the same network through femto enabled mobiles, as the FEM looks like any other base station to the legacy terminal. Further details relating to this are explained below.

If a subset of mobile terminals in a macro network are equipped with femtocell functionality (femtocell enabled mobiles), new applications can be enabled for mobile units in the vicinity of the FEM, including legacy mobiles that do not include femtocell functionality. Among other things, these new applications may include femto-enabled peer-to-peer communication, Local Mobile Networks (e.g., for public safety or group activity), open access femtocells without a backhaul requirement, adaptive coverage enhancement, enhanced position location determination, and/or local broadcast of media. As will be explained in further detail below, these new applications can be enabled for legacy terminals (LM) (e.g., non-femtocell enabled mobiles) with the assistance of femtocell enabled mobiles (FEM).

In further detail, referring to FIG. 4, system 400 includes a wireless communications apparatus 402 that is shown to be in communication with a multitude of devices. These devices are labeled as mobile device$_1$ 404, mobile device$_2$ 406, and mobile device$_N$ 408, where N is an integer. Mobile devices 404, 406, and 408 can be devices that are femto enabled, non-femto enabled, or combinations thereof (e.g., some devices are femto enabled while other devices are non-femto enabled). For example, wireless communication apparatus 402 and mobile devices 404, 406 and 408 may be computer devices including a memory storing applications executable by a processor to enable various device functionality, such as communications with other devices via a communications module having transmit and receive components operable to interface directly with other devices or with a wired or wireless communication network.

Included in wireless communication apparatus 402 is a receiver 410 that is configured to receive a communication origination request from a mobile device, such as mobile device$_1$ 404 (which will be referred to herein as sender device 404). The origination request indicates that sender device 404 desires to establish communication with another mobile device, such as a destination device 408. A proximity detection module 412 is configured to evaluate the capabilities of destination device 408 to determine whether destination device 408 is femto enabled or non-femto enabled. For example, proximity detection module 412 may include one or any combination of hardware, software, code, instructions, firmware, algorithms, data, etc., operable to perform the functionality described herein. Detection module 412 is also configured to determine if sender device 404 is in the same vicinity (e.g., sector) as destination device 408. Sender device 404 can be either non-femto enabled or femto enabled.

If destination device 408 is femto enabled and both devices (sender 404 and destination 408) are in the same vicinity, a transmitter 414 sends a page to destination device 408 to set up the communication (e.g., Enhanced Channel Assignment Message (ECAM), Service Connect Message (SCM) are sent). A reverse link (RL) user code of sender device 404 is sent by transmitter 414 to destination device 408 with a request for destination device 408 to search for sender device 404 on an uplink or reverse link (RL).

A RL measurement (Ecp) reported by destination device 408 is received at receiver 410. Based in part on this report, proximity detection module 412 can determine that both devices 404, 408 are close together and should start a femto-enabled peer-to-peer session. A forward link (FL) pseudorandom noise (PN) offset and designated frequency $f_{FEM}$, which are to be used in the femto-enabled peer-to-peer communication, are sent to destination device 408 by transmitter 414. Destination device 408 can perform self-calibration on the designated frequency $f_{FEM}$ and begin transmitting pilot and overhead on the frequency. The terms pilot and overhead channels as used herein include, among others, pilot, paging, broadcast, and synchronizations channels Wireless communication apparatus 402 can perform inter-frequency handoff for sender device 404 to the designated frequency $f_{FEM}$. As such, a femto-enabled peer-to-peer communication session can be started by sender device 404.

In accordance with some aspects, if the sender device 404 and the destination device 408 are both non-femto enabled and/or for open access femtocells without the requirement of a backhaul, after receiving the call origination request and determining the devices 404, 408 are in the same vicinity, a communication can be sent by transmitter 414 requesting femto enabled devices in the communications environment to transmit pilots and common overhead channels on frequency $f_{FEM}$ at designated PN offsets. A request for pilot measurements from both devices 404, 408 on the designated frequency $f_{FEM}$ can also be requested.

A call setup module 416 reviews the reported signal strength. For example, call setup module 416 may include one or any combination of hardware, software, code, instructions, firmware, algorithms, data, etc., operable to perform the functionality described herein. If both devices 404, 408 report strong signal strength from a femto-enabled device, e.g., a femto enabled device in the sector, represented by mobile device$_2$ 406 having a FEM module 418, call setup module 416 chooses that femto-enabled device 406 as the "hub" for femto-enabled peer-to-peer communication. FEM module 418 includes a forward link (FL) transmit (Tx) function that enables FEM 406 to transmit communications to other mobile devices on the FL. Also, FEM module 418 includes a reverse link (RL) receive (Rx) function that enables FEM 406 to receive communications from other mobile devices. Accordingly, FEM 406 is able to establish a first FL and a first RL with wireless communication apparatus 402, such as an access point, or with a first mobile communication device, and a second FL and a second RL with a second mobile communication device, thereby enabling FEM 406 to be a serving sector for other mobile devices. For example, in some aspects, FEM module 418 may include a mobile station modem (MSM) to enable the mobile station functionality, and a cell site modem (CSM) to enable the base station-like functionality. As such, FEM module 418 may include one or any combination of hardware, software, code, instructions, firmware, algorithms, data, etc., operable to perform the functionality described herein, which enables FEM 406 to be perceived as a base station by other mobile devices, and to perform base station-like functionality, thereby defining a femto-enabled mobile.

Based on the determination of call setup module 416, transmitter 414 sends a page to the femto-enabled device 406 and sets up the call. The femto-enabled device 406 performs self calibration on the designated frequency $f_{FEM}$ and starts transmitting pilot and overhead on frequency $f_{FEM}$. Wireless communications apparatus 402 performs inter-frequency handoff for non-femto enabled devices to the designated frequency $f_{FEM}$. The non-femto enabled devices 404, 408 acquire the femto-enabled device 406 on the forward link and a femto-enabled peer-to-peer communication session is started between the non-femto-enabled devices 404, 408.

In accordance with some aspects, a femto-enabled device can create a local mobile network for emergency applications, team building, or other group events. The femto-enabled device can transmit pilot and common overhead channels to advertise the mobile network and can accept registration requests to collect a list of users. Thus, the femto-enabled device can enable communication between mobiles in the same geographical area and/or broadcast emergency messages to mobiles in the same geographical area.

According to some aspects, a femto enabled device can be enabled with wireless backhaul capability so that if the device is in poor macro coverage, the femto enabled device can provide coverage for non-femto enabled devices by activating its (the femto enable device's) functionality. In this situation, the femto enabled device detects that macro coverage is poor, connects to alternative wireless backhaul, and enables femto functionality.

A femto enabled device can enhance position location determination in accordance with some aspects. Forward link pilot measurements from femto enabled devices can be utilized to improve position location estimates of mobiles. A femto enabled device with reliable location information can transmit pilots and common overhead channels on designated frequencies. Mobiles in the vicinity of the femto enabled device(s) can detect the pilot and common overhead channel signal from the femto enabled device. Given the GPS location information of the femto enabled devices, mobiles in poor GPS coverage can improve their position location estimates utilizing the pilot and common overhead channels from the femto enabled device as part of their triangulation algorithm.

The following will describe some use cases and technical details for operation in accordance with the various aspects presented herein. In the remainder of this detailed description, aspects relating to 3G technologies (CDMA2000, 1xEV-DO, WCDMA, HSPA+) will be described, however, other technologies can be utilized. Since femto enabled mobiles (FEMs) can potentially create interference for other mobiles in the vicinity, for this discussion it will be assumed that some frequencies are allocated (e.g. dedicated) for femtocell enabled mobiles (e.g., $f_{FEM}$) so that interference created to macrocell mobiles can be mitigated.

Various aspects will be presented herein with respect to femto-enabled peer-to-peer communication applications between 3G mobiles with the assistance of FEMs in a network. An advantage of this type of operation is that none of the system resources (e.g., airlink, channel elements, backhaul) of the macrocell system are used. Additionally, applications apply to legacy mobiles without requiring any changes in standards or implementation for legacy mobiles. For the purpose of discussion, mobile users in the cellular network are classified into two groups: (1) Femto enabled mobiles (FEMS); and (2) Legacy mobiles without femtocell functionality (LM) or non-femto enabled devices. Different scenarios will be described depending on the parties involved in femto-enabled peer to peer communication (e.g., LM, FEM). For each use case, the operation is described to enable femto-enabled peer-to-peer communication between mobiles.

Figure 5:
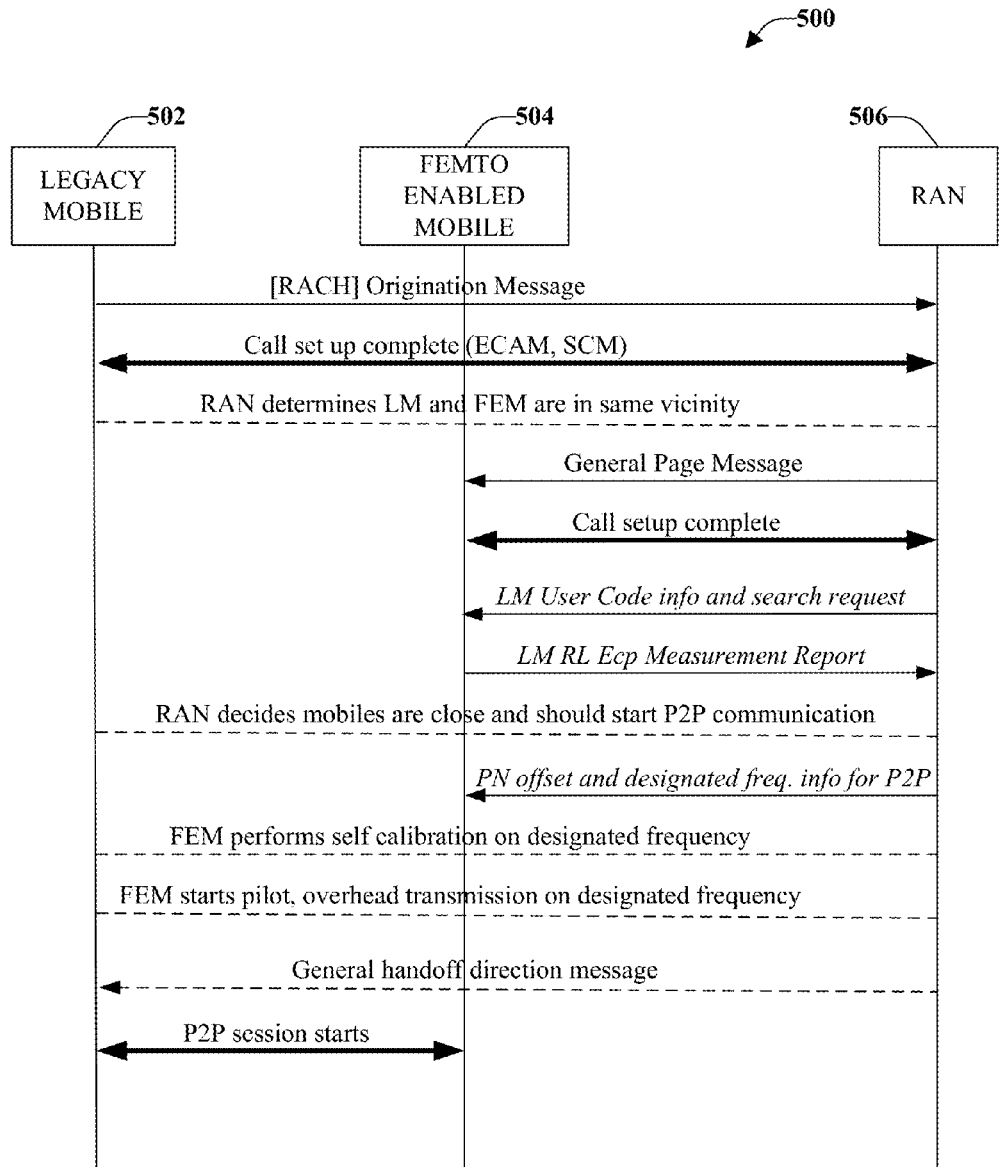
FIG. 5 illustrates a call flow example for a non-femto enabled device that communicates with a femto enabled device.

FIG. 5 illustrates a call flow example 500 for a Legacy Mobile (LM) device 502 that communicates with a Femto Enabled Mobile (FEM) 504. The communication can be, for example, a voice call in 1xRTT mobiles. In the illustrated scenario, LM 502 calls the FEM 504, which are in the same geographical area for femto-enabled peer-to-peer application.

A call is initiated by LM 502 and intended for FEM 504. A call origination message is sent from LM 502 destined for another mobile and is received by a RAN 506, which accepts the call request from LM 502 (e.g., ECAM, SCM are sent). Among other things, RAN 506 may be a cellular base station such as a macrocell. The RAN may then determine whether LM 502 and the destination mobile are geographically proximate, or in the same vicinity. The RAN 506 may also determine whether a femto enabled device is in the vicinity. For example, the RAN 506 determines that the destination mobile 504 is femto enabled and is in the same vicinity (e.g., sector and so forth) as LM 502 (for this case scenario). The geographic proximity may be determined in any of a number of ways. Among others, proximity may be determined based on location information, such as may be obtained through the use of satellite-based GPS functions, through the use of terrestrial network-based location information (e.g. via cellular base station signal timing), by determining that the FEM and LM are within coverage of the same base station, by determining that the FEM and LM are within a proximity threshold of one another based on their respective location information, wherein the proximity threshold may be configurable depending on the carrier, geographic or network area, devices involved, etc., or the RAN 506 may obtain the geographic proximity or threshold determination from another entity.

Once general proximity has been determined, such as by determining that both the FEM and LM are within the range of the same RAN, further information may also be gathered regarding the level of proximity of the FEM and LM. For example, the FEM may be instructed to transmit a pilot signal and common overhead channels that are received by the LM and reported to the RAN. Then, the RAN determines whether to use the FEM to establish a femto-enabled peer to peer application based on the report from the LM.

RAN 506 pages the FEM 504 and sets up the call (e.g., ECAM, SCM are sent).

Aspects may include a FEM and RAN structured to establish a femto-enabled peer to peer application based on these elements. After determining that the LM 502 and the FEM 504 are in the same vicinity, the RAN 506 may perform a handoff of the LM 502 to the FEM 504.

Additionally, embodiments may include any of the following elements. The RAN 506 may communicate a reverse link (RL) user code of the LM 502 to the FEM 504 and requests that the FEM 504 search for the particular user (e.g., LM 502) on the uplink (UL), also referred to as the reverse link (RL).

The FEM 504 may report an RL measurement (Ecp) to RAN 506. Based on the FEM report, the RAN 506 determines that the mobiles (LM 502 and FEM 504) are close to each other and should start the femto-enabled peer-to-peer session. The RAN 506 may indicate the FL PN offset and designed frequency $f_{FEM}$ to FEM 504 that is to be used in femto-enabled peer-to-peer communication. In accordance with some aspects, an optimal PN offset and designated frequency $f_{FEM}$ assignment can be performed based on measurements performed by FEM 504.

The FEM 504 may perform a self calibration on designed frequency $f_{FEM}$. For example, the FEM adjusts a FL transmit power and uplink noise figure. A goal can be to mitigate the interference impact to other mobiles. An RL Ecp measurement from LM 502 and RAN FL pilot and common overhead channel measurements can be utilized to assist in self calibration.

The FEM 504 starts transmitting pilot and overhead on frequency $f_{FEM}$. The RAN 506 performs inter-frequency handoff for LM 502 to designated frequency $f_{FEM}$ (e.g., general handoff direction message is sent). The LM 502 acquires FEM 504 on FL and femto-enabled peer-to-peer communication session is initiated.

Thus, no additional changes are necessary for communication with legacy mobiles. The FEM functions similarly to a base station, and the legacy mobile communications as if through a base station.

In accordance with some aspects, a femto enabled mobile (FEM) can initiate communication with another femto enabled mobile (FEM) in a similar geographic area for femto-enabled peer-to-peer communication. This femto-enabled peer-to-peer communication can be enabled by utilizing a similar operation as the operation described above with reference to a legacy mobile (LM) that initiates communication with a femto enabled mobile.

Methodologies that can be implemented in accordance with various aspects will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
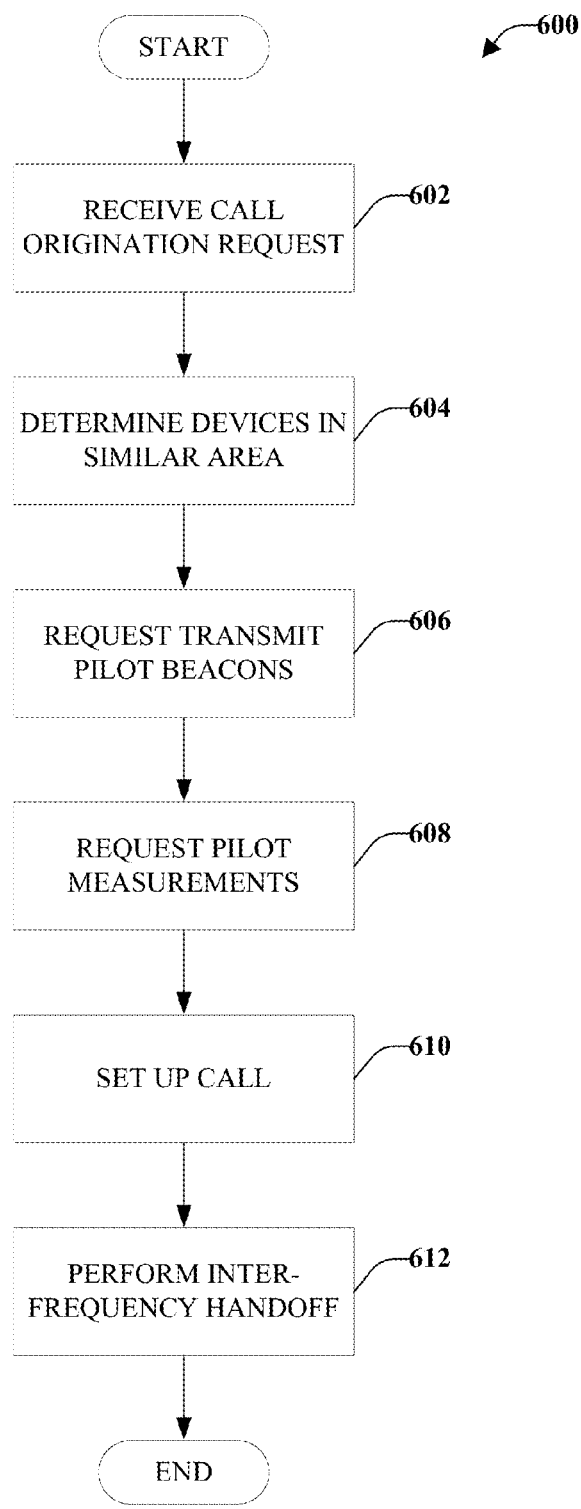
FIG. 6 illustrates a method for a non-femto enabled device calling another non-femto enabled device in a similar geographic area for femto-enabled peer-to-peer communications.

FIG. 6 illustrates a method 600 for a legacy mobile (LM) device calling another LM in a similar geographic area for femto-enabled peer-to-peer application. If a FEM is also located in the geographic area, the FEM can receive and transmit the communication between the two LMs, similar to a RAN. Thus, the FEM is capable of functioning as, for example, a base station between two LMs. As with the above described application, no changes are necessary for the LM, the LM communicates through the FEM in the same manner as it would through an RAN. At 602, a RAN receives a call origination request from a LM. The RAN accepts the call request from the LM (e.g., ECAM, SCM are sent). At 604, the RAN determines that the destination mobile is in the same vicinity (e.g., sector, etc.) as the caller mobile.

The RAN discovers that one or more FEMs are in the same area and, at 606, the RAN requests the FEMs to transmit pilot and common overhead channels on frequency $f_{FEM}$ at designated PN offsets. In accordance with some aspects, the FEM users are provided an incentive since there can be an impact to the device's battery life (e.g., FEMs can earn minutes for their "service", receive an account credit, and so forth.).

At 608, the RAN requests pilot and common overhead channel measurements from both LMs on the designated frequency $f_{FEM}$. If both LMs report a threshold signal strength from a particular FEM on frequency $f_{FEM}$, the RAN chooses that particular FEM (from the one or more FEMs) as the "hub" for femto-enabled peer-to-peer communication. The selection of a particular FEM can be reevaluated throughout the communication and changed at any time.

The RAN pages the chosen FEM and sets up the call, at 610. The FEM performs self calibration on the designated frequency $f_{FEM}$. For example, the FEM adjusts a FL transmit power and uplink noise figure, which can mitigate the interference impact to other mobiles. RL Ecp measurements from LMs and RAN FL pilot and common overhead channel measurements can be utilized to assist in self calibration. The FEM starts transmitting pilot and overhead on frequency $f_{FEM}$.

At 612, the RAN performs inter-frequency handoff for LM to designated frequency $f_{FEM}$. For example, a general handoff direction message is sent. LMs acquire FEM on FL and femto-enabled peer-to-peer communication session is initiated between the LMs.

In accordance with some aspects, open access femtocells without a backhaul requirement operate in substantially the same manner as that shown and described with reference to FIG. 6. In accordance with this aspect, low cost femtocells are located in high traffic areas with femto-enabled peer-to-peer traffic (e.g., schools, shopping malls, and so forth). These femtocells can be plugged into a power supply (e.g., power outlet) and do not need a backhaul. Legacy Mobile (LM) can communicate with another LM in the same geographical area for a femto-enabled peer-to-peer application.

The handoff of a call from an RAN to a FEM can occur at various times. For example, when a call is originated, the RAN may cause the calling mobile to wait while it is determined if the calling and destination mobiles are in the same vicinity and if a FEM is also in the same vicinity. The RAN may cause the calling mobile to wait until a handoff is made from the RAN to the FEM. Additionally, the RAN may first set up the call between the calling mobile and the destination mobile and then handoff the communication to a FEM. For example, the proximity determinations may be made during call set up and after call set up. The RAN may handoff the communication to a more efficient call mode at any time during the communication between the calling mobile and the destination mobile.

In addition to proximity, the RAN may consider additional factors. For example, the RAN may consider the amount of traffic already managed by a FEM before handing off a call to the FEM. The FEM, or a plurality of FEMs in a geographic region, may have a limited set of frequencies for transmission. The RAN may consider the capability threshold and current load for the FEM, or the plurality of FEMs in the geographic region, before handing off communication to the FEM, or one of the FEMs. Among others, the RAN may consider signal strength, the amount of traffic, the amount of frequencies available, possible interference, the distribution that will provide the highest data rate possible, and the distribution that will maximize throughput. As discussed above, these determinations may be made before the call is setup, or at any time during the call.

In assigning a caller pair to a FEM, in order to maximize the overall system throughput, may involve considering the number of caller pairs served by the FEM as well as their current throughputs, not just a Signal to Interference plus Noise Ratio (SINR). For example, if too many mobiles are served by a first FEM, new calls may be assigned to other FEMs although calls may have a better SNR from the first FEM. Once a mobile is assigned to an FEM, the assignment may be kept throughout the call, or mobiles may be re-assigned to different FEMs based on changes in the signal quality (SNR) due to mobility or due to the arrival or departure of other mobiles in the system.

In assigning mobiles to different FEMs, different optimization criteria may be used. One method may include maximizing the total, or cumulative, throughput of all the mobiles in the system. Another method may include maximizing the minimum throughput a user obtains in the system.

Whether maximizing the system throughput or the maximizing the minimum throughput, the throughput may be calculated over all possible assignments of caller pairs to FEMs, and the best assignment is chosen. In addition, for a sequential assignment, at every step, a FEM is either turned ON to serve a caller pair, or a caller pair is assigned to a FEM that is already ON, whichever maximizes the desired parameter.

In performing a one-shot assignment for a small number of caller pairs, the FEMs may be arranged in order of decreasing common SNR they provide to the caller pair under consideration, and the top two FEMs may be considered for allocation. Additionally, when a plurality of FEMs are located in a region, use of each of the FEMs may be alternated. Among others, a time division may be employed between FEMs, or a repetitive alternating schedule, such as a round robin type schedule, may be employed among the plurality of FEMs.

Figure 7:
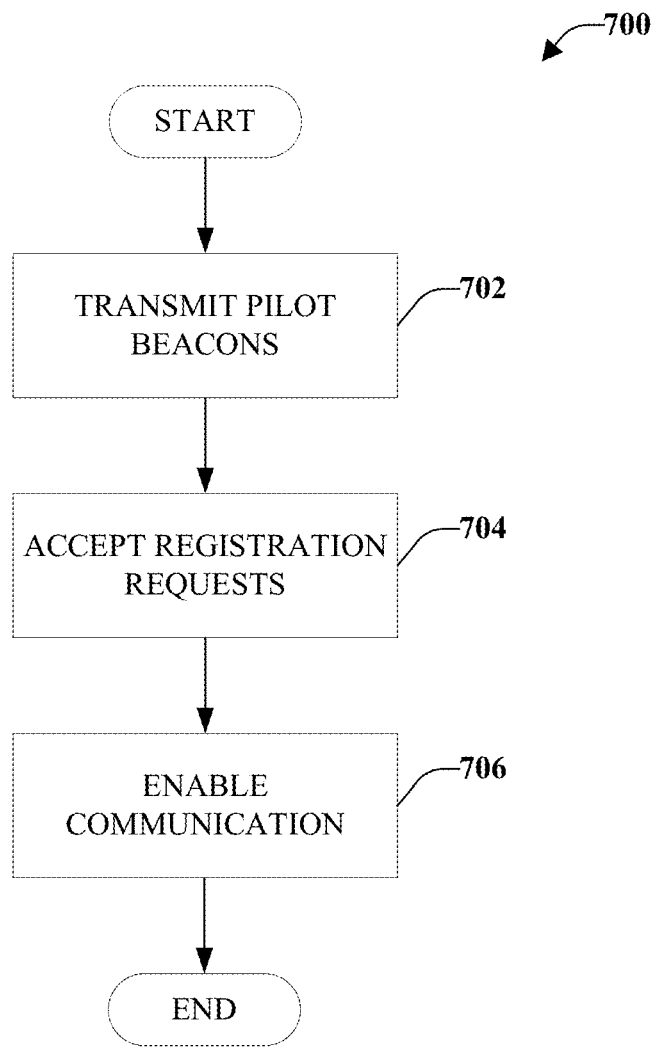
FIG. 7 illustrates a method for creating a local mobile network utilizing a femto enabled device.

With reference now to FIG. 7, illustrated is a method 700 for creating a local mobile network. The local mobile network can be created by a FEM for emergency applications (e.g., broadcast local emergency information). In accordance with some aspects, a local mobile network can be created for team building and/or group events that are closed to others that are not to be included in the group. The application may be used for groups in remote locations, such as locations not covered by another RAN. A local mobile network can also be created for parties where media is shared as well as for other purposes.

At 702, a FEM transmits pilot and common overhead channels to advertise a mobile network. For emergency applications, the pilots and common overhead channels can be transmitted on all frequencies. For non-emergency applications, the pilots and common overhead channels can be transmitted on designated $f_{FEM}$. Then, users may select an option to join the advertised mobile network. This selection sends a registration request to the FEM. For example, a use may push a button to receive transmissions from the mobile network established by the FEM. At 704, the FEM accepts registration requests and collects a list of users. Communication between mobiles in a same geographic area is enabled, at 706. In accordance with some aspects, emergency messages can be broadcast to mobiles in the same geographic area.

Figure 8:
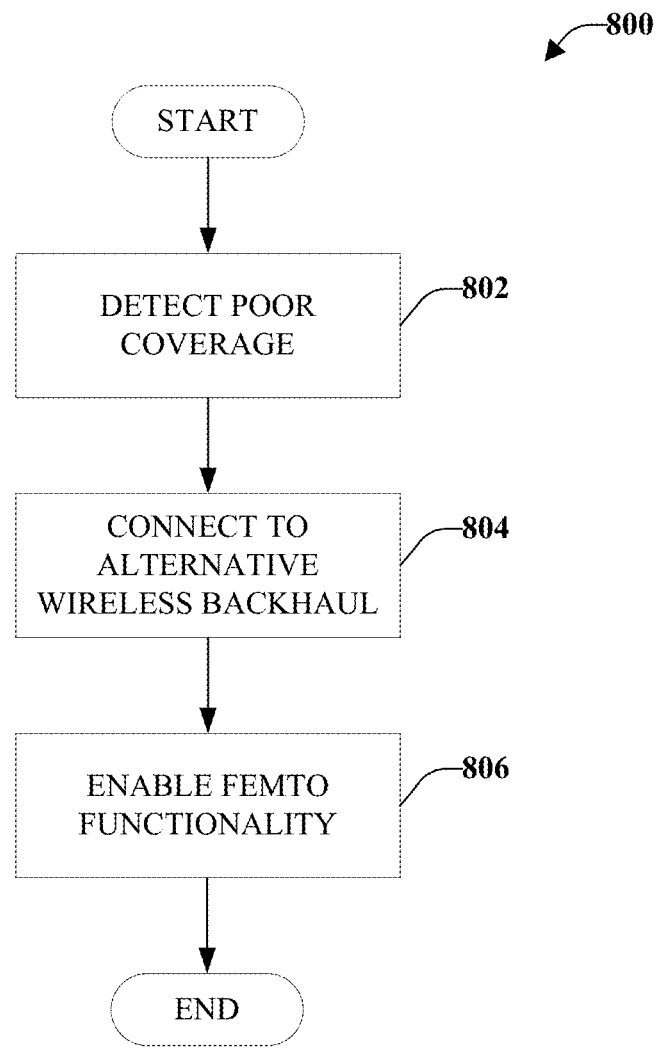
FIG. 8 illustrates another method for adaptive coverage enhancement in accordance with the aspects presented herein.

FIG. 8 illustrates another method 800 for adaptive coverage enhancement. A FEM can be enabled with wireless backhaul capacity (e.g., WiFi, Bluetooth, and so forth). When FEM is in a poor cellular coverage, femto functionality is enabled to provide coverage for LMs. As with the above applications, the LM communicates as though with an RAN. Thus, the FEM extends or improves coverage for any LMs in the same geographic region by providing access to alternative wireless backhaul for devices that use cellular communication, but that cannot access the alternative wireless backhaul on their own.

At 802, a FEM detects that cellular coverage is poor (e.g., below a threshold value). This detection can be based on various parameters (e.g., signal strength, signal-to-noise ratio, and so forth). If the cellular coverage is poor, at 804, the FEM connects to an alternative wireless backhaul (e.g., hotspot, campus WiFi network, home WiFi network, and so on). At 806, the femto functionality is enabled. Such enablement can include starting to transmit pilot, overhead, etc. on multiple frequencies. LMs in the vicinity of the FEM can acquire the femtocell and communicate with FEM as their BTS.

In accordance with some aspects, enhanced position location determination can be enabled by FEMs. FL pilot and common overhead channel measurements from FEMs can be utilized to improve position location estimates of mobiles. According to this aspect, a FEM with reliable location information (e.g., strong GPS signal) transmits a pilot and common overhead channels on designated frequencies. Mobiles in the vicinity of FEMs can detect the FEM pilot or common overhead channel signal. Given the GPS location information of the transmitting FEM, mobiles in the poor GPS coverage area can improve their position location estimates using the FEM pilot or common overhead channel as part of a triangulation algorithm. The FEM can be used in combination with other base stations to triangulate the location of other mobiles. If the FEM is closer to the mobile that is attempting to determine its location, the FEM signal received by the mobile will be more reliable because of its proximity. The accuracy of the FEM signal will be more reliable not only in signal strength, but also in timing. By more accurately estimating the time of arrival of the FEM pilot signal, the location determination of the mobile may be improved. During this use, the FEM may be moving whereas the other base stations are not. This can improve the position location estimates of the other mobiles.

For example, the FEM may obtain or determine its position. The FEM may then communicate its position to a position/location determination entity. The FEM may also transmit a pilot or common overhead signal. A mobile device receiving the transmitted pilot or overhead signal from the FEM then uses the pilot or overhead information in determining its own location. The determination may be made by the mobile device itself or by transmitting the received information to the position/location determination entity that calculates the mobile device's position and sends the mobile device's position to the mobile device.

Figure 14:
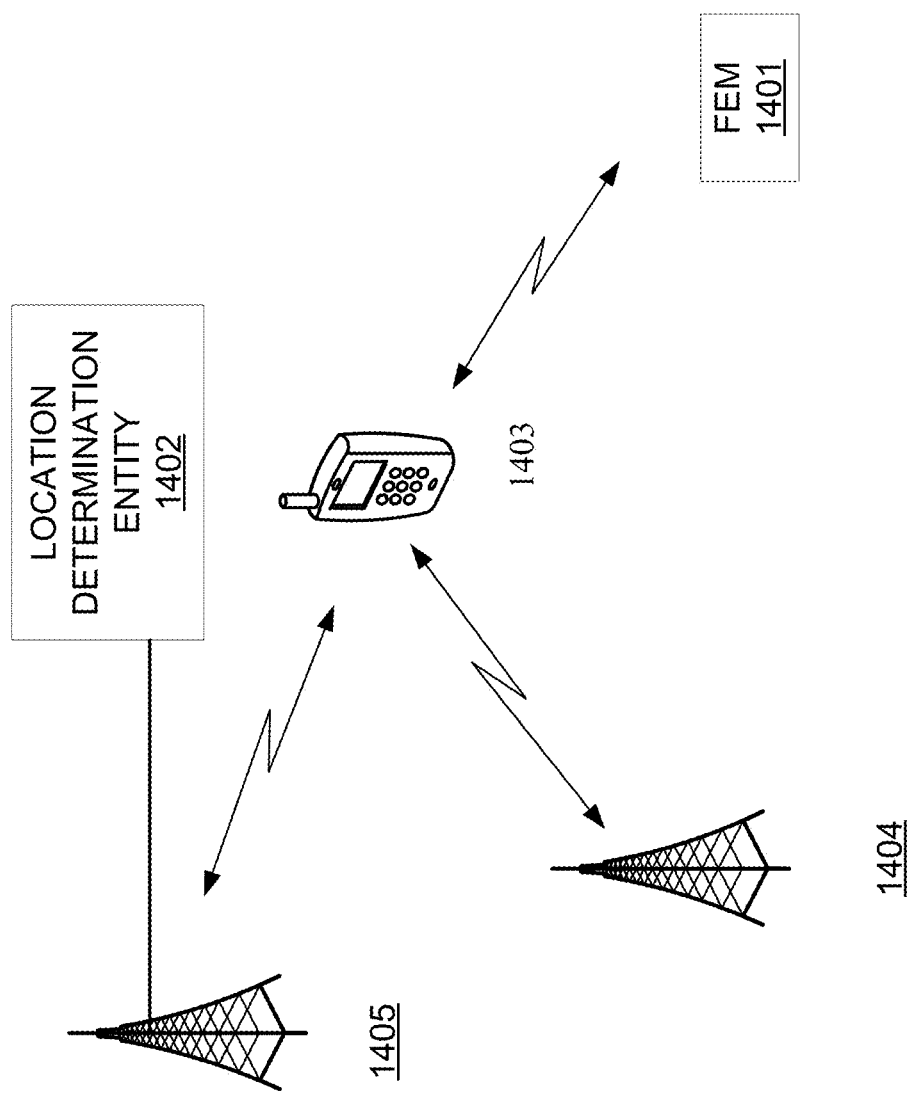
FIG. 14 illustrates an example system of a using a femto enabled device to determine a position.

FIG. 14 illustrates an exemplary variation where a mobile device 1403 receives position information from a number of sources. As noted above, the mobile device may use the received position information and determine its own location itself, or the mobile device may send the received information to a location determination entity 1402 that determines the location of the mobile device 1403 and sends the location to the mobile device. Communication between the location determination entity 1402 and the mobile device may be made via a base station 1405. FIG. 14 illustrates that mobile device receives a signal useful for position determination, such as a timing signal, and/or additional information, such as a location of the signal transmitting device, from base stations 1404 and 1405 and from a femto enabled device 1401. Although only one FEM is illustrated, either of the base stations 1404 and 1405 may also be replaced by a FEM. Accordingly, mobile device 1403 is able to determine or obtain its own position based, at least in part, on the position of FEM 1401.

In accordance with some aspects, local broadcast of broadcast media through FEMS is provided. FEMs enabled with broadcast media functionality can transmit media content to other mobile devices that are within a similar geographic area. For example, a FEM device is capable of receiving broadcast media, such as the MediaFLO™ service from QUALCOMM, Inc. of San Diego, Calif. The FEM establishes a communication channel with other mobile devices in the vicinity that are not broadcast media capable but are interested in receiving the content. In accordance with some aspects, an application can be utilized for content selection from FEM to legacy mobile. The FEM enabled with broadcast media capability can transmit the requested media to the mobiles in the vicinity.

In accordance with the various aspects, if a subset or fraction of mobile terminals in a macro network are equipped with femtocell functionality (e.g., femtocell enable mobiles), new applications can be enabled for all mobiles (including legacy mobile terminals). Such applications include, but are not limited to, femto-enabled peer-to-peer communication, local mobile network (e.g., for public safety or group activity), open access femtocells without a backhaul requirement, adaptive coverage enhancement, and/or enhanced position location determination.

Figure 9:
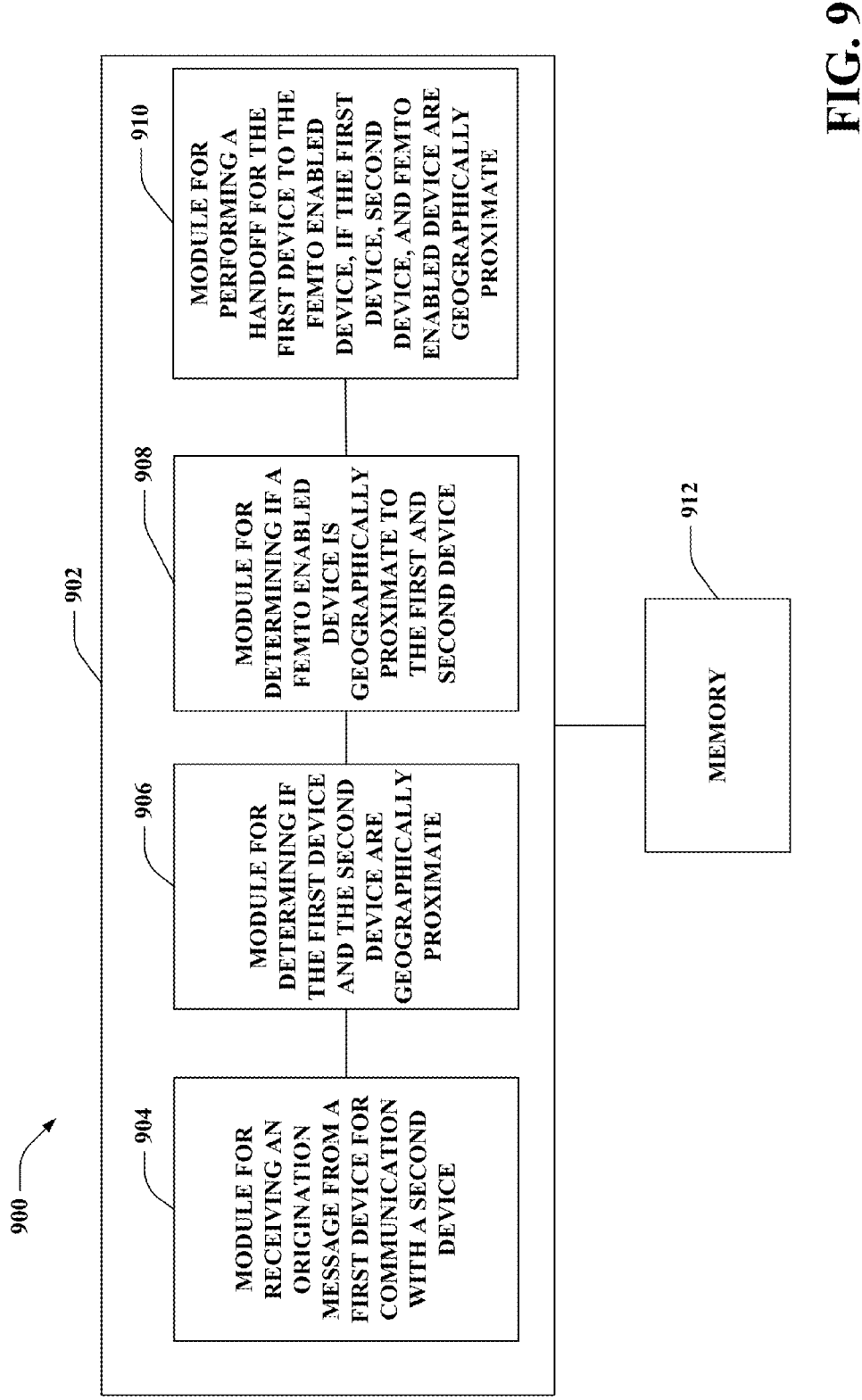
FIG. 9 illustrates an example system of a wireless communications apparatus that enables femtocell functionality.

With reference to FIG. 9, illustrated is a wireless communication system 900 that enables femtocell functionality. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include a module for receiving an origination message from a first device for communication with a second device 904; a module for determining if the first device and the second device are geographically proximate 906; a module for determining if a femto enabled device is geographically proximate to the first and second device 908; and a module for performing a handoff for the first device to the femto enabled device, if the first device, second device, and femto enabled device are geographically proximate 910.

Additionally, system 900 can include a memory 912 that retains instructions for executing functions associated with electrical components 904, 906, 908 and 910. While shown as being external to memory 912, it is to be understood that one or more of electrical components 904, 906, 908 and 910 can exist within memory 912.

Figure 10:
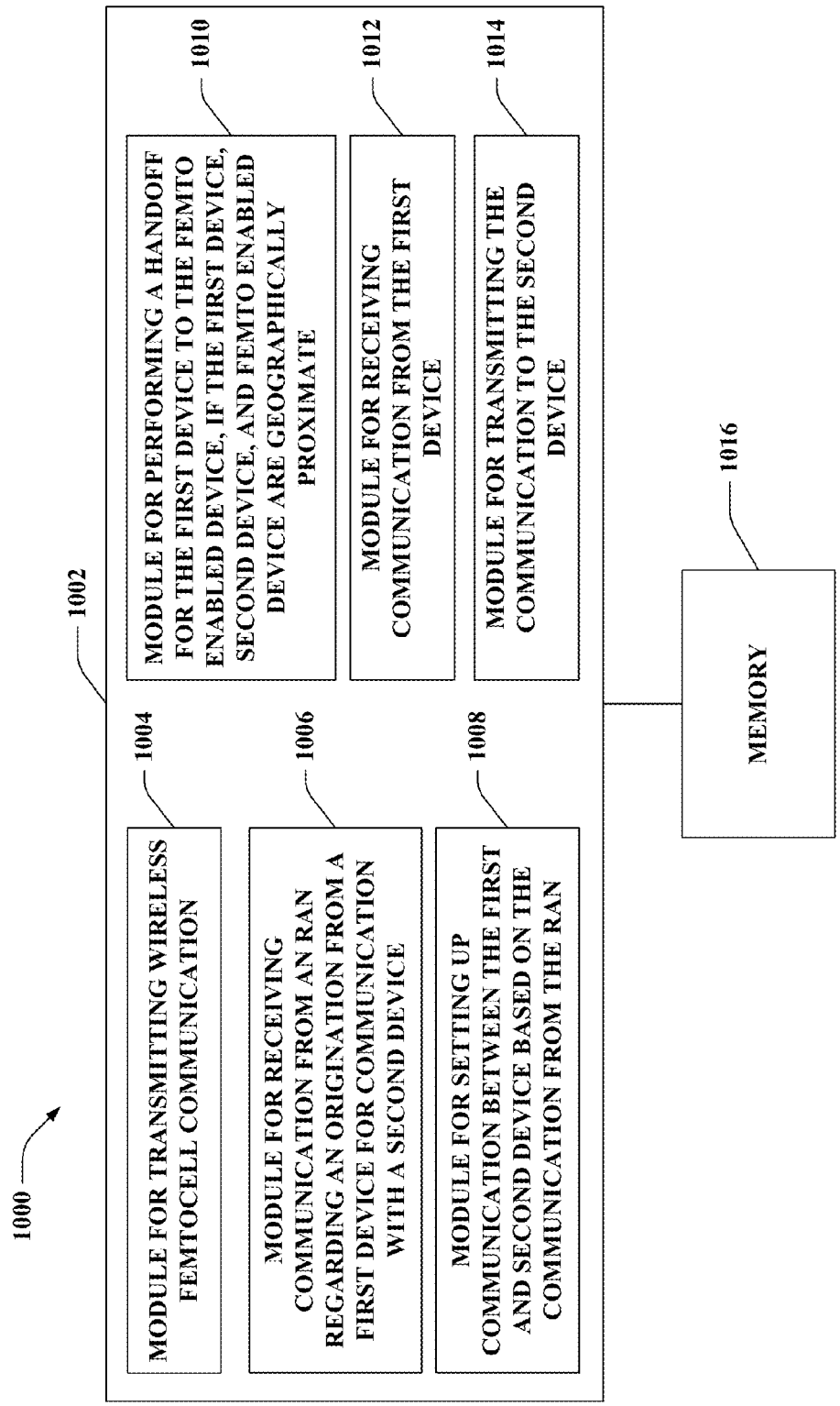
FIG. 10 illustrates an example system of a wireless communication apparatus.

FIG. 10 illustrates an exemplary wireless communications apparatus 1000. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include a module for transmitting wireless femtocell communication 1004; a module receiving communication from an RAN regarding an origination from a first device for communication with a second device 1006; and a module for setting up communication between the first and second device based on the communication from the RAN 1008. The wireless communication device may further include a module for receiving communication from the first device 1010 and means for transmitting the communication to the second device 1012.

Additionally, system 1000 can include a memory 1014 that retains instructions for executing functions associated with electrical components 1004, 1006, 1008, 1010, and 1012. While shown as being external to memory 1014, it is to be understood that one or more of electrical components 1004, 1006, 1008, 1010, and 1012 can exist within memory 1014.

Figure 11:
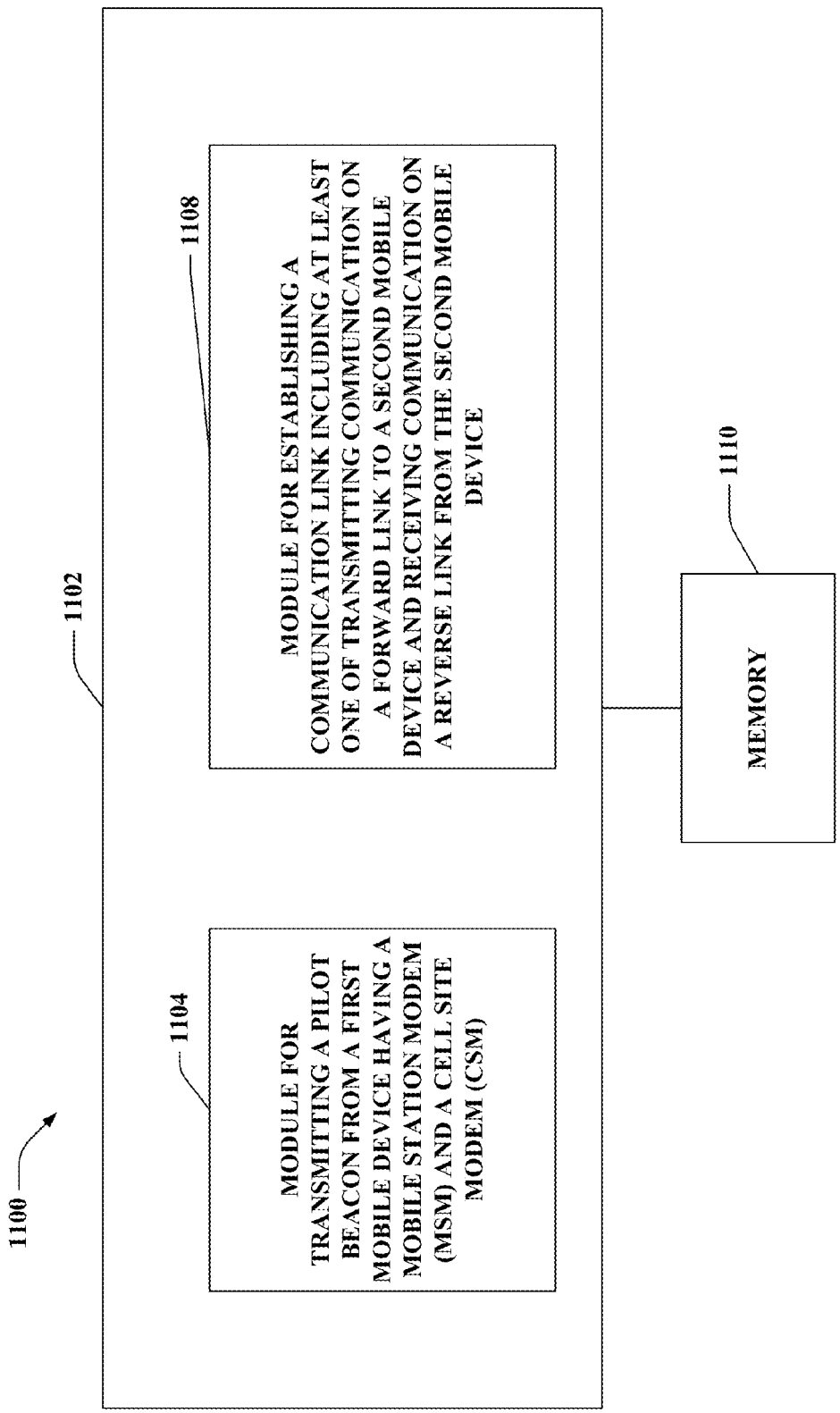
FIG. 11 illustrates an example system of a wireless communication apparatus that provides a local mobile network.

FIG. 11 illustrates an exemplary wireless communications apparatus 1100. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include a module for transmitting a pilot and common overhead channels from a first mobile device having a mobile station modem (MSM) and a cell site modem (CSM) 1104, and a module for establishing a communication link including at least one of transmitting communication on a forward link to a second mobile device and receiving communication on a reverse link from the second mobile device 1108.

Additionally, system 1100 can include a memory 1110 that retains instructions for executing functions associated with electrical components 1104, 1108. While shown as being external to memory 1110, it is to be understood that one or more of electrical components 1104 and 1108 can exist within memory 1110.

Figure 12:
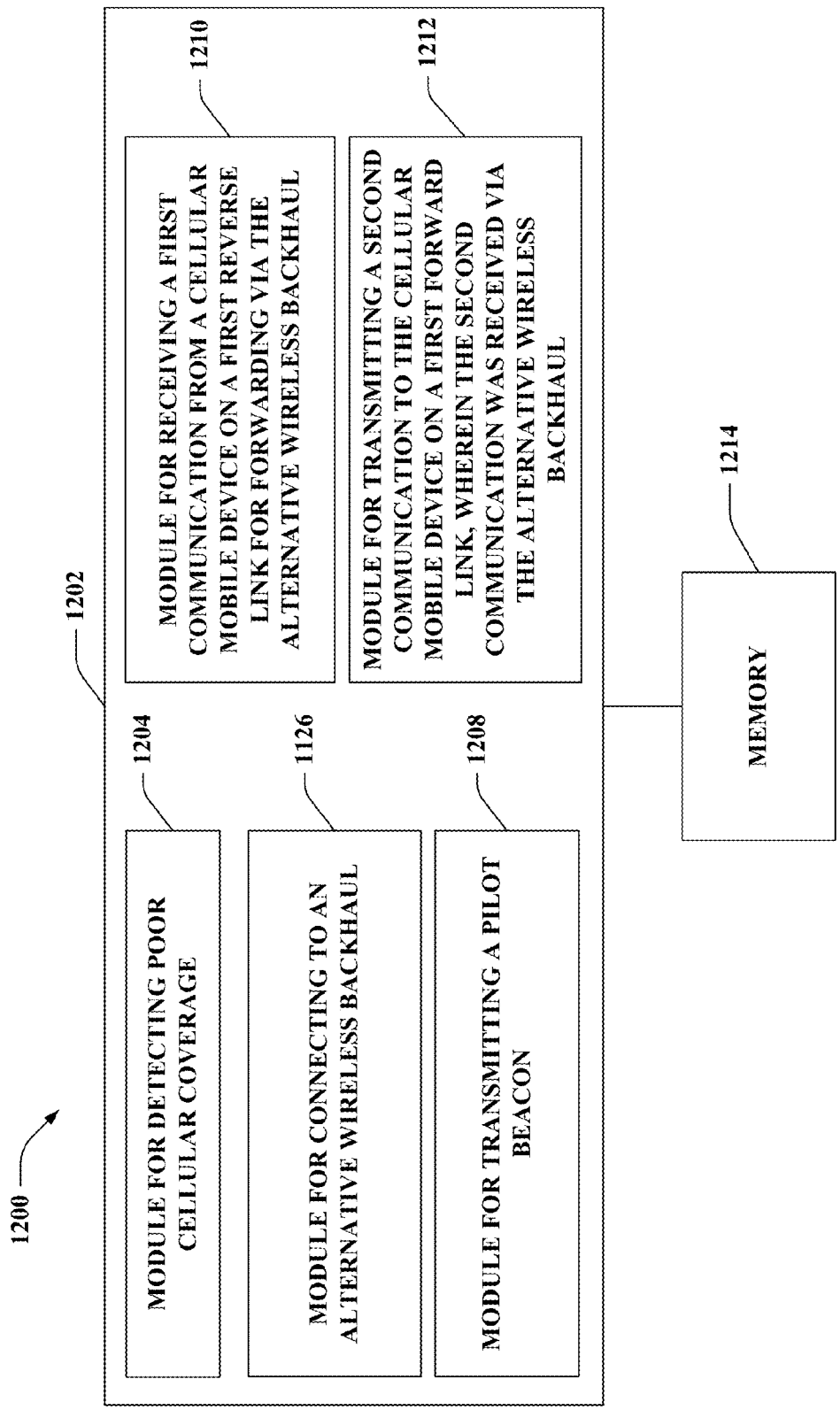
FIG. 12 illustrates an example system of a wireless communication apparatus that enables adaptive coverage using a femto enabled device.

FIG. 12 illustrates an exemplary wireless communications apparatus 1200. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include a module for detecting poor cellular coverage 1204, a module for connecting to an alternative wireless backhaul 1206, a module for transmitting a pilot and common overhead channels 1208, and a module for receiving a first communication from a cellular mobile device on a first reverse link for forwarding via the alternative wireless backhaul 1210, and a module for transmitting a second communication to the cellular mobile device on a first forward link, wherein the second communication was received via the alternative wireless backhaul 1212.

Additionally, system 1200 can include a memory 1214 that retains instructions for executing functions associated with electrical components 1204, 1206, 1208, 1210, and 1212. While shown as being external to memory 1214, it is to be understood that one or more of electrical components 1204, 1206, 1208, 1210, and 1212 can exist within memory 1214.

Figure 13:
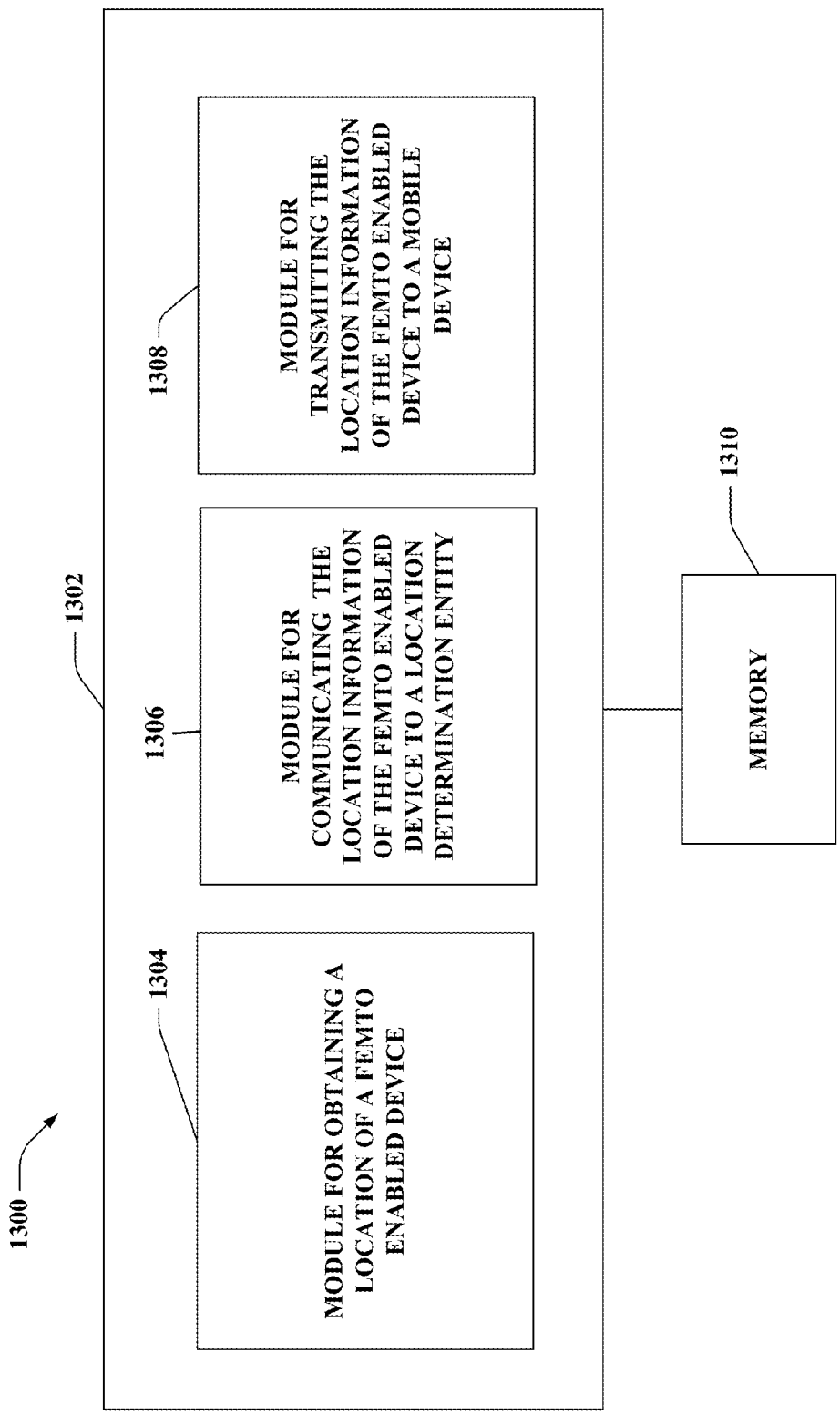
FIG. 13 illustrates an example system of a wireless communication apparatus for determining position location using a femto enabled device.

FIG. 13 illustrates an exemplary wireless communications apparatus 1300. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include a module for obtaining a location of a femto enabled device 1304; a module for communicating the location information to a location determination entity 1306; and a module for transmitting the location information of the femto enabled device to a mobile device 1308.

Additionally, system 1300 can include a memory 1310 that retains instructions for executing functions associated with electrical components 1304, 1306, and 1308. While shown as being external to memory 1310, it is to be understood that one or more of electrical components 1304, 1306, and 1308 can exist within memory 1310.

While the specification describes particular examples of the present aspects, those of ordinary skill can devise variations of these aspects without departing from the described concept. For example, the teachings herein refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. Additionally, in some aspects, the steps and/or actions of a method or algorithm may reside as one or any combination or set of codes and/or instructions on a machine readable medium and/or computer readable medium, which may be incorporated into a computer program product.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for enabling communication through a mobile device, comprising:
    receiving, at the mobile device, communication from a Radio Access Network (RAN) regarding an origination request received at the RAN from a first device, wherein the origination request requests the first device to establish communication with a second device;
    activating, at the mobile device, a femto functionality that facilitates communication between the first device and the second device via the mobile device; and
    initiating, by the mobile device, a femto-enabled peer-to-peer communication session between the first device and the second device using the femto functionality to allow local communications between the first device and second device via the mobile device and the femto-enabled peer-to-peer communication session.

2. The method of claim 1, wherein the first device is a femto enabled device.

3. The method of claim 1, wherein the second device is a femto enabled device.

4. The method of claim 1, wherein the first device and the second device are non-femto enabled devices, the method further comprising:
    receiving communication from the first device; and
    transmitting the communication to the second device.

5. The method of claim 1, further comprising:
    receiving user code information and a search request for at least one of the first device and the second device from the RAN; and
    reporting an Ecp measurement to the RAN.

6. The method of claim 1, further comprising:
    receiving a Pseudorandom Noise (PN) offset and designated frequency information from the RAN.

7. The method of claim 6, further comprising:
    performing a self calibration on the designated frequency.

8. A wireless communications apparatus for enabling communication through a mobile device, comprising:
    means for receiving, at the mobile device, communication from a Radio Access Network (RAN) regarding an origination request received at the RAN from a first device, wherein the origination request requests the first device to establish communication with a second device;
    means for activating, at the mobile device, a femto functionality that facilitates communication between the first device and the second device via the mobile device; and
    means for initiating, at the mobile device, a femto-enabled peer-to-peer communication session between the first device and the second device using the femto functionality to allow local communications between the first device and second device via the mobile device and the femto-enabled peer-to-peer communication session.

9. The wireless communications apparatus of claim 8, wherein the first device and the second device are non-femto enabled devices, the method further comprising:
    means for receiving communication from the first device; and
    means for transmitting the communication to the second device.

10. A wireless communication apparatus for enabling communication through a mobile device comprising:
    memory; and
    a processor configured to:
        receive, at the mobile device, communication from a Radio Access Network (RAN) regarding an origination request received at the RAN from a first device, wherein the origination request requests the first device to establish communication with a second device;

activate, at the mobile device, a femto functionality that facilitates communication between the first device and the second device via the mobile device; and initiating, by the mobile device, a femto-enabled peer-to-peer communication session between the first device and the second device using the femto functionality to allow local communications between the first device and second device via the mobile device and the femto-enabled peer-to-peer communication session.

11. The apparatus of claim 10, wherein the processor is further configured to:
receive wireless communications on a forward link from the RAN and on a reverse link from at least one mobile communication apparatus; and
transmit wireless information on a reverse link to the RAN and on a forward link to the at least one mobile communication apparatus.

12. The apparatus of claim 10, wherein the processor is further configured to:
receive communication on a reverse link from the first device, and to transmit communication on the forward link to the second device.

13. The apparatus of claim 10, further comprising:
a Mobile Station Modem (MSM) chipset; and
a Cell Site Modem (CSM) chipset.

14. The apparatus of claim 10, wherein the first device is a femto enabled device.

15. The apparatus of claim 14, wherein the second device is a femto enabled device.

16. The apparatus of claim 14, wherein the first device and the second device are non-femto enabled devices, wherein the processor is further configured to:
receive communication from the first device; and
transmit the communication to the second device.

17. The apparatus of claim 10, wherein the processor is further configured to:
receive user code information and a search request for at least one of the first device and the second device from the RAN; and
report an Ecp measurement to the RAN.

18. The apparatus of claim 10, wherein the processor is further configured to:
receive a Pseudorandom Noise (PN) offset and designated frequency information from the RAN.

19. The apparatus of claim 18, wherein the processor is further configured to:
perform a self calibration on the designated frequency.

20. A non-transitory computer-readable medium storing instructions executable by a processor for enabling communication through a mobile device comprising:
code for receiving, at the mobile device, communication from a Radio Access Network (RAN) regarding an origination request received at the RAN from a first device, wherein the origination request requests the first device to establish communication with a second device;
code for activating, at the mobile device, a femto functionality that facilitates communication between the first device and the second device via the mobile device; and
code for initiating, by the mobile device, a femto-enabled peer-to-peer communication session between the first device and the second device using the femto functionality to allow local communications between the first device and second device via the mobile device and the femto-enabled peer-to-peer communication session.

21. The computer readable medium of claim 20, comprising:
code for receiving communication from the first device; and
code for transmitting the communication to the second device.

* * * * *